(12) United States Patent
Masuda et al.

(10) Patent No.: US 12,716,711 B2
(45) **Date of Patent: *Aug. 25, 2026**

(54) DISTANCE MEASUREMENT DEVICE, DISTANCE MEASUREMENT METHOD, AND DISTANCE MEASUREMENT PROGRAM

(71) Applicant: FUJIFILM CORPORATION, Tokyo (JP)

(72) Inventors: Tomonori Masuda, Saitama (JP); Hiroshi Tamayama, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 216 days.

This patent is subject to a terminal disclaimer.

(21) Appl. No.: 18/585,670

(22) Filed: Feb. 23, 2024

(65) Prior Publication Data

US 2024/0191984 A1 Jun. 13, 2024

Related U.S. Application Data

(63) Continuation of application No. 17/457,433, filed on Dec. 2, 2021, now Pat. No. 11,940,265, which is a (Continued)

(30) Foreign Application Priority Data

Aug. 5, 2014 (JP) ................................ 2014-159735

(51) Int. Cl.

*G01C 3/08* (2006.01)
*G01B 11/14* (2006.01)

(Continued)

(52) U.S. Cl.

CPC .............. *G01B 11/14* (2013.01); *G01S 17/10* (2013.01); *G01S 17/88* (2013.01); *G02B 7/40* (2013.01);

(Continued)

(58) Field of Classification Search

CPC ........ G01B 11/14; H04N 23/63; H04N 23/56; H04N 23/71; H04N 23/673; G01S 17/10;

(Continued)

(56) References Cited

U.S. PATENT DOCUMENTS 10,539,410 B2* 1/2020 Masuda .................. G01S 17/10
10,551,186 B2 2/2020 Masuda et al.

(Continued)

FOREIGN PATENT DOCUMENTS

DE 3908069 A1 9/1990
DE 60207395 T2 6/2006

(Continued)

OTHER PUBLICATIONS

International Preliminary Report on Patentability issued in International Application No. PCT/JP2015/061741 on Dec. 16, 2015.

(Continued)

*Primary Examiner* — Mark Hellner

(74) *Attorney, Agent, or Firm* — SOLARIS Intellectual Property Group, PLLC

(57) ABSTRACT

A distance measurement device includes an imaging unit which captures a subject image formed by an imaging optical system, an emission unit which emits directional light as light having directivity along an optical axis direction of the imaging optical system, a light receiving unit which receives reflected light of the directional light from the subject, a derivation unit which derives a distance to the subject based on the timing at which the directional light is emitted and the timing at which the reflected light is received, a display unit which displays the subject image, and a control unit which performs control such that, in a case of performing a distance measurement, the display unit displays the subject image as a motion image and transition is made to a state where actual exposure by the imaging unit (Continued)

DISTANCE MEASUREMENT DEVICE 10 is possible at the timing of the end of the distance measurement.

21 Claims, 17 Drawing Sheets

Related U.S. Application Data continuation of application No. 16/687,895, filed on Nov. 19, 2019, now Pat. No. 11,221,208, which is a continuation of application No. 15/413,416, filed on Jan. 24, 2017, now Pat. No. 10,539,410, which is a continuation of application No. PCT/JP2015/061741, filed on Apr. 16, 2015.

(51) Int. Cl.

| | |
|---|---|
| ***G01S 17/10*** | (2020.01) |
| ***G01S 17/88*** | (2006.01) |
| ***G02B 7/40*** | (2021.01) |
| ***H04N 23/56*** | (2023.01) |
| ***H04N 23/63*** | (2023.01) |
| ***H04N 23/71*** | (2023.01) |
| *G01S 7/484* | (2006.01) |
| *G01S 7/486* | (2020.01) |
| *G01S 7/4865* | (2020.01) |
| *G01S 7/51* | (2006.01) |
| *H04N 23/67* | (2023.01) |

(52) U.S. Cl.

CPC ............. *H04N 23/56* (2023.01); *H04N 23/63* (2023.01); *H04N 23/71* (2023.01); *G01S 7/484* (2013.01); *G01S 7/4865* (2013.01); *G01S 7/4868* (2013.01); *G01S 7/51* (2013.01); *H04N 23/673* (2023.01)

(58) Field of Classification Search

CPC .......... G01S 17/88; G01S 7/673; G01S 7/484; G01S 7/4868; G02B 7/40

See application file for complete search history.

(56) References Cited

U.S. PATENT DOCUMENTS 11,221,208 B2 * 1/2022 Masuda ................. H04N 23/63
11,940,265 B2 * 3/2024 Masuda ................. H04N 23/56
2002/0148947 A1 10/2002 Kakiuchi et al.
2004/0151345 A1 * 8/2004 Morcom ............... G01S 17/894 382/104
2008/0122933 A1 * 5/2008 Murayama .......... H10F 39/1532 257/E27.162
2014/0063261 A1 3/2014 Betensky et al.

FOREIGN PATENT DOCUMENTS

| | | | |
|---|---|---|---|
| DE | 102013217240 | A1 | 3/2014 |
| JP | H05-172564 | A | 7/1993 |
| JP | 2002-090116 | A | 3/2002 |
| JP | 2002-207163 | A | 7/2002 |
| JP | 2002-262308 | A | 9/2002 |
| JP | 2003-130953 | A | 5/2003 |
| JP | 2003-255046 | A | 9/2003 |
| JP | 2004-028601 | A | 1/2004 |
| JP | 2006-322834 | A | 11/2006 |
| JP | 2008-96181 | A | 4/2008 |
| WO | 02082201 | A1 | 10/2002 |

OTHER PUBLICATIONS

Non-Final Office Action issued by USPTO on May 1, 2019, in related U.S. Appl. No. 15/413,416.
Notice of Allowance issued by USPTO on Aug. 22, 2019, in related U.S. Appl. No. 15/413,416.
English language translation of the following: Office action dated Jan. 18, 2021 from the DPMA in a German patent application No. 112015003608.3 corresponding to the instant patent application.
Non-Final Office Action issued by USPTO on Mar. 18, 2021, in related U.S. Appl. No. 16/687,895.
Notice of Allowance issued by USPTO on Sep. 8, 2021 in related U.S. Appl. No. 16/687,895.
Non-Final Office Action issued by USPTO on Jul. 3, 2023, in related U.S. Appl. No. 17/457,433.
Notice of Allowance issued by USPTO on Nov. 29, 2023 in related U.S. Appl. No. 17/457,433.
English language translation of the following: Office action dated Mar. 16, 2026 from the DPMA in aapplication No. 11 2015 003 608.3 corresponding to the instant patent application. This office action translation is submitted now in order to supplement the understanding of the citedbeing disclosed in the instant Information Disclosure Statement.

* cited by examiner

FIG. 1

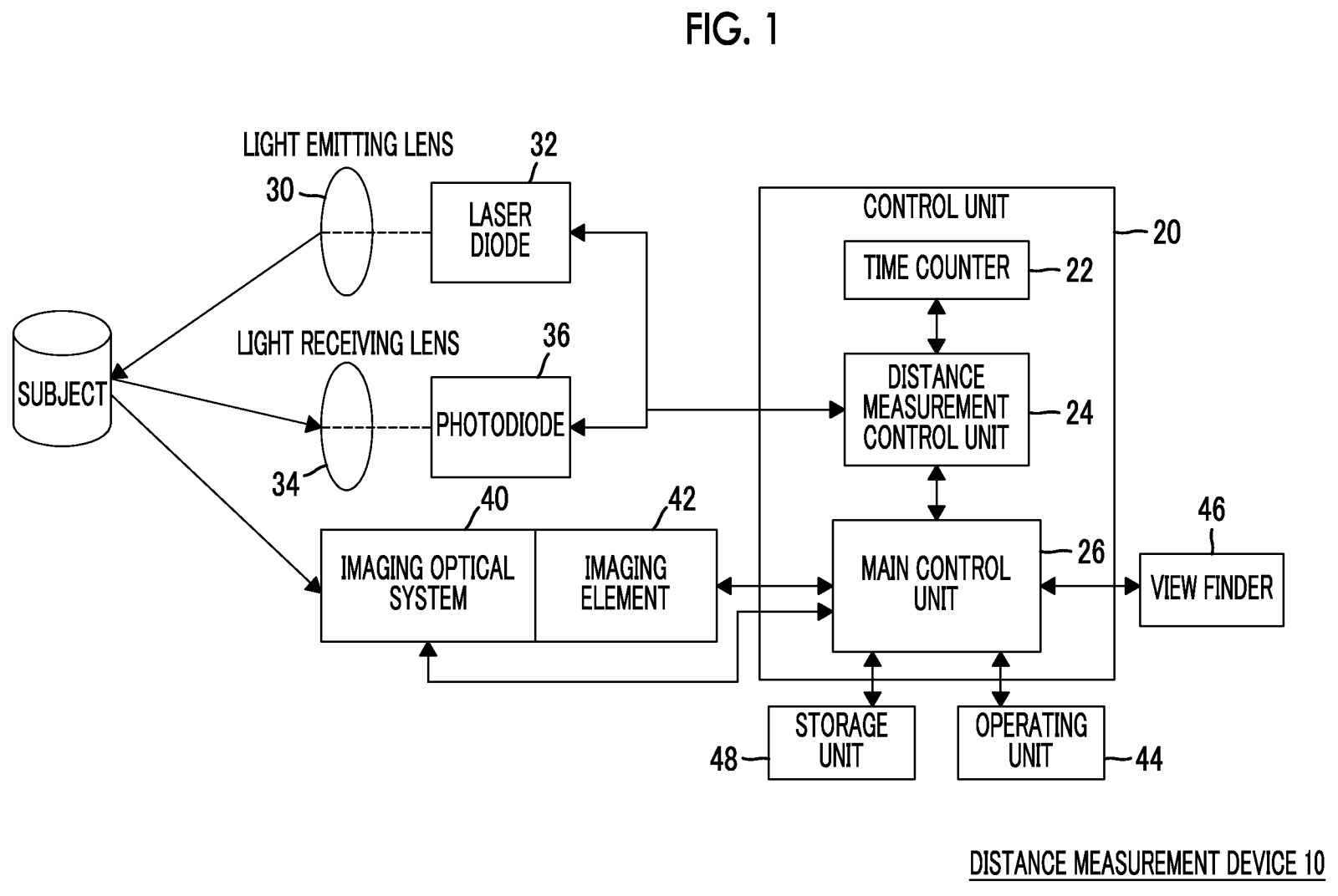

DISTANCE MEASUREMENT DEVICE 10

CONTROL UNIT 20
TIME COUNTER 22
DISTANCE MEASUREMENT CONTROL UNIT 24
MAIN CONTROL UNIT 26
LIGHT EMITTING LENS 30
LASER DIODE 32
LIGHT RECEIVING LENS 34
PHOTODIODE 36
IMAGING OPTICAL SYSTEM 40
IMAGING ELEMENT 42
OPERATING UNIT 44
VIEW FINDER 46
STORAGE UNIT 48
SUBJECT

Figure 6:
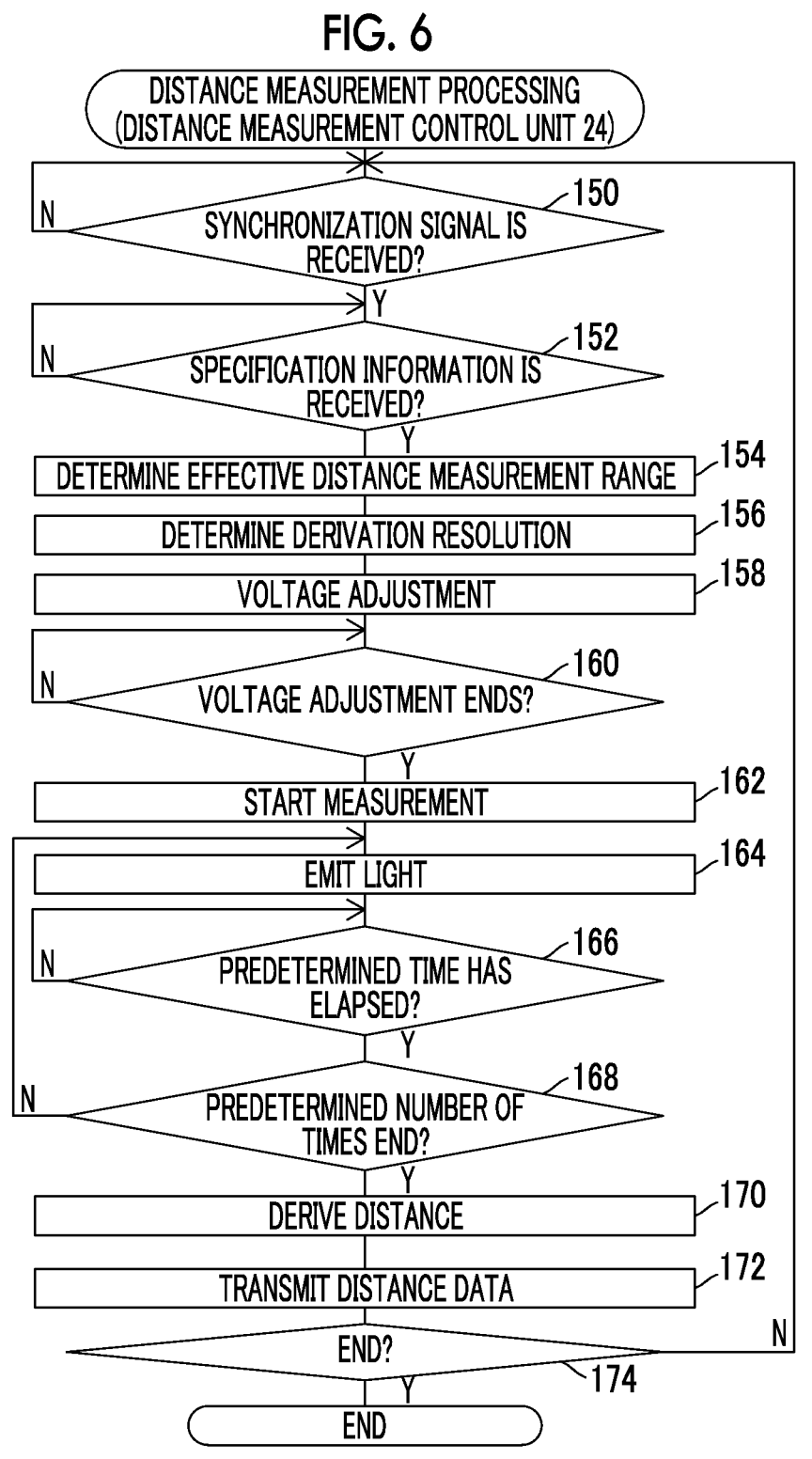

DISTANCE MEASUREMENT PROCESSING (DISTANCE MEASUREMENT CONTROL UNIT 24)

150 SYNCHRONIZATION SIGNAL IS RECEIVED? N / Y

152 SPECIFICATION INFORMATION IS RECEIVED? N / Y

154 DETERMINE EFFECTIVE DISTANCE MEASUREMENT RANGE

156 DETERMINE DERIVATION RESOLUTION

158 VOLTAGE ADJUSTMENT

160 VOLTAGE ADJUSTMENT ENDS? N / Y

162 START MEASUREMENT

164 EMIT LIGHT

166 PREDETERMINED TIME HAS ELAPSED? N / Y

168 PREDETERMINED NUMBER OF TIMES END? N / Y

170 DERIVE DISTANCE

172 TRANSMIT DISTANCE DATA

174 END? N / Y

END

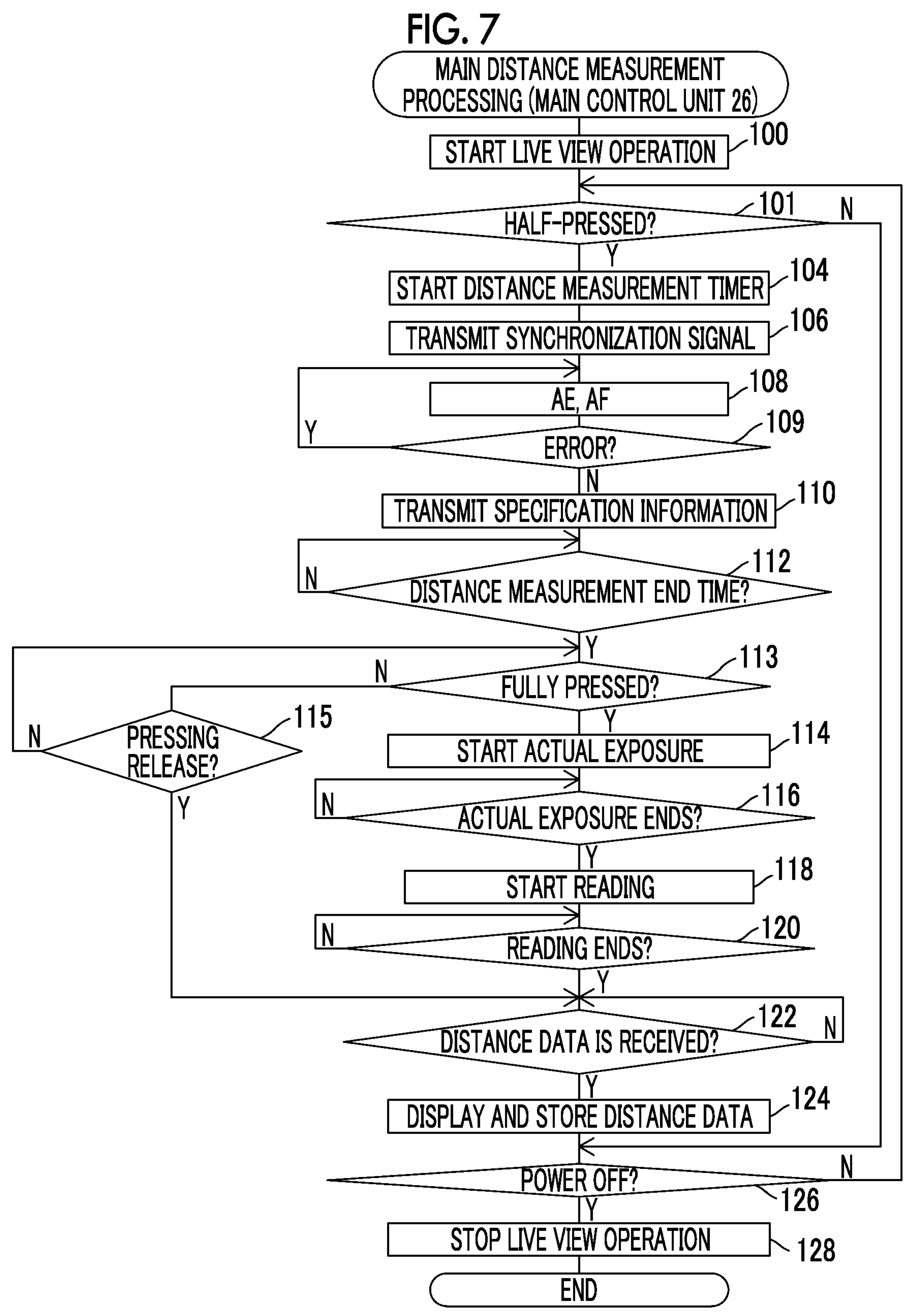
FIG. 7
MAIN DISTANCE MEASUREMENT PROCESSING (MAIN CONTROL UNIT 26)
START LIVE VIEW OPERATION
100
HALF-PRESSED?
101
N
Y
START DISTANCE MEASUREMENT TIMER
104
TRANSMIT SYNCHRONIZATION SIGNAL
106
AE, AF
108
ERROR?
109
Y
N
TRANSMIT SPECIFICATION INFORMATION
110
DISTANCE MEASUREMENT END TIME?
112
N
Y
FULLY PRESSED?
113
N
Y
PRESSING RELEASE?
115
N
Y
START ACTUAL EXPOSURE
114
ACTUAL EXPOSURE ENDS?
116
N
Y
START READING
118
READING ENDS?
120
N
Y
DISTANCE DATA IS RECEIVED?
122
N
Y
DISPLAY AND STORE DISTANCE DATA
124
POWER OFF?
126
N
Y
STOP LIVE VIEW OPERATION
128
END

300

| SUBJECT BRIGHTNESS | LIGHT EMISSION FREQUENCY |
|---|---|
| $L_1$ | $N_1$ |
| $L_2$ | $N_2$ |
| ⋮ | ⋮ |
| $L_n$ | $N_n$ |

500

| EXPOSURE STATE SPECIFICATION INFORMATION | LIGHT EMISSION FREQUENCY |
|---|---|
| $E_1$ | $N_1$ |
| $E_2$ | $N_2$ |
| ⋮ | ⋮ |
| $E_n$ | $N_n$ |

DISTANCE MEASUREMENT DEVICE, DISTANCE MEASUREMENT METHOD, AND DISTANCE MEASUREMENT PROGRAM

CROSS-REFERENCE TO RELATED APPLICATIONS

This application is a continuation application of application Ser. No. 17/457,433, filed on Dec. 2, 2021, which is a continuation application of application Ser. No. 16/687,895, filed on Nov. 19, 2019, which is a continuation application of application Ser. No. 15/413,416, filed on Jan. 24, 2017, which a continuation application of International Application No. PCT/JP2015/061741, filed on Apr. 16, 2015, the entire contents of these applications are incorporated herein by reference in their entirety. Further, this application claims priority from Japanese Patent Application No. 2014-159735, filed on Aug. 5, 2014, the disclosure of which is incorporated by reference herein in its entirety.

BACKGROUND

Technical Field

A technique of the present disclosure relates to a distance measurement device, a distance measurement method, and a distance measurement program.

Description of the Related Art

JP2008-96181A discloses a device including time detection means for detecting the time from the emission of measurement light to the reception of measurement light by light receiving means, shake amount detection means for detecting a shake amount of a housing during emission of measurement light when measurement light is emitted from light emitting means, and distance determination means for determining the distance to an object to be measured based on the time detected by the time detection means and the shake amount detected by the shake amount detection means.

JP2002-207163A discloses a distance measurement and imaging device having a function of performing focus adjustment, a distance measurement function of measuring a distance to a subject by irradiating the subject with a laser beam along an optical axis of a lens and detecting reflected light of the laser beam, and an imaging function of imaging the subject.

However, in the technique of JP2008-96181A, the distance to the object to be measured can be measured, but imaging of the object to be measured is not considered.

In the technique of JP2002-207163A, since still image capture is not considered, if transition is made to still image capture during distance measurement, a live view image of the subject cannot be temporarily displayed, and the subject under a distance measurement cannot be confirmed even though a distance measurement is being performed.

SUMMARY

The invention has been accomplished in consideration of the above-described facts, and provides a distance measurement device, a distance measurement method, and a distance measurement program storage medium capable of performing a distance measurement while confirming a subject even if still image capture is instructed.

A distance measurement device according to a first aspect of the invention comprises an imaging unit which captures a subject image formed by an imaging optical system forming the subject image indicating a subject, an emission unit which emits directional light as light having directivity along an optical axis direction of the imaging optical system, a light receiving unit which receives reflected light of the directional light from the subject, a derivation unit which derives a distance to the subject based on the timing at which the directional light is emitted by the emission unit and the timing at which the reflected light is received by the light receiving unit, a display unit which displays the subject image captured by the imaging unit, and a control unit which performs control such that, in a case of performing a distance measurement by the emission unit, the light receiving unit, and the derivation unit, the display unit displays the subject image captured by the imaging unit as a motion image and transition is made to a state where actual exposure by the imaging unit is possible at the timing of the end of the distance measurement. With this, the distance measurement device according to the first aspect of the invention can perform the distance measurement while confirming the subject even if still image capture is performed.

According to a second aspect of the invention, in the distance measurement device according to the first aspect of the invention, the timing of the end of the distance measurement may be the timing of the end of a period during which light emission and light reception are performed by the emission unit and the light receiving unit. With this, the distance measurement device according to the second aspect of the invention can transition to the actual exposure without waiting until the distance is completely derived.

According to a third aspect of the invention, in the distance measurement device according to the first aspect of the invention, the timing of the end of the distance measurement may be the timing of the end of a derivation period during which the distance is derived by the derivation unit. With this, the distance measurement device according to the third aspect of the invention can reliably perform the distance measurement while confirming the subject since the subject image is displayed until the derivation of the distance is finished.

According to a fourth aspect of the invention, in the distance measurement device according to any one of the first to third aspects of the invention, the imaging unit may perform the actual exposure by the imaging unit in a case where the distance is derived by the derivation unit. With this, the distance measurement device according to the fourth aspect of the invention can reliably make the derived distance correspond to a captured image obtained by the actual exposure.

According to a fifth aspect of the invention, the distance measurement device according to any one of the first to fourth aspects of the invention may further comprise a setting unit which sets the possibility of the actual exposure by the imaging unit in advance in a case where the derivation of the distance by the derivation unit is impossible. With this, the distance measurement device according to the fifth aspect of the invention can arbitrarily set whether or not to perform the actual exposure in a case where the derivation of the distance is impossible.

According to a sixth aspect of the invention, the distance measurement device according to any one of the first to fifth aspects of the invention may further comprise a storage unit which stores the distance derived by the derivation unit, and in a case where the derivation of the distance by the derivation unit is impossible, storage by the storage unit may be stopped. With this, the distance measurement device according to the sixth aspect of the invention can prevent storage of incomplete distance data.

According to a seventh aspect of the invention, the distance measurement device according to the sixth aspect of the invention may further comprise a storage setting unit which sets whether or not to stop storage by the storage unit in a case where the derivation of the distance by the derivation unit is impossible. With this, the distance measurement device according to the seventh aspect of the invention can arbitrarily set whether or not to perform storage in the storage unit in a case where the derivation of the distance is impossible.

According to an eighth aspect of the invention, the distance measurement device according to any one of the first to seventh aspects of the invention may further comprise a focus adjustment unit which performs focus adjustment of the imaging optical system to the subject based on the distance derived by the derivation unit. With this, the distance measurement device according to the eighth aspect of the invention can easily perform focus adjustment at the time of the actual exposure.

According to a ninth aspect of the invention, in the distance measurement device according to any one of the first to eighth aspects of the invention, the derivation unit may derive the distance in a case where there is no focus adjustment error by a focus adjustment unit performing focus adjustment of the imaging optical system to the subject and no exposure adjustment error by an exposure adjustment unit adjusting exposure in a case where the imaging unit performs imaging. With this, the distance measurement device according to the ninth aspect of the invention can display an image focused and subjected to focus adjustment until transition to a state where the actual exposure is possible.

According to a tenth aspect of the invention, in the distance measurement device according to any one of the first to ninth aspects of the invention, the derivation unit may perform the derivation of the distance multiple times, in a case of deriving a distance having a high frequency among the distances obtained by deriving the distance multiple times as a final distance, may determine a distance range for use in determining the frequency and a time range from the emission to the reception of the directional light based on an adjustment result of a focus adjustment unit performing focus adjustment of the imaging optical system to the subject, and may derive the distance to the subject with a resolution determined according to a determined result. With this, the distance measurement device according to the tenth aspect of the invention can derive the distance to the subject in units of minute numerical values.

According to an eleventh aspect of the invention, in the distance measurement device according to any one of the first to tenth aspects of the invention, the emission unit may be able to adjust the emission intensity of the directional light, and in a case of deriving the distance, may adjust the emission intensity based on an adjustment result of a focus adjustment unit performing focus adjustment of the imaging optical system to the subject to emit the directional light. With this, the distance measurement device according to the eleventh aspect of the invention can derive the distance to the subject with proper emission intensity not affected by noise of ambient light.

According to a twelfth aspect of the invention, in the distance measurement device according to the eleventh aspect of the invention, the emission unit may make the emission intensity lower when a focal distance adjusted by the focus adjustment unit is shorter. With this, the distance measurement device according to the twelfth aspect of the invention can derive the distance to the subject with proper emission intensity not affected by noise of ambient light.

According to a thirteenth aspect of the invention, in the distance measurement device according to any one of the first to twelfth aspects of the invention, the light receiving unit may be able to adjust light receiving sensitivity, and in a case of deriving the distance, may adjust the light receiving sensitivity based on an adjustment result of a focus adjustment unit performing focus adjustment of the imaging optical system to the subject to receive the reflected light. With this, the distance measurement device according to the thirteenth aspect of the invention can derive the distance to the subject with proper light receiving sensitivity not affected by noise of ambient light.

According to a fourteenth aspect of the invention, in the distance measurement device according to the thirteenth aspect of the invention, the light receiving unit may make the light receiving sensitivity lower when a focal distance adjusted by the focus adjustment unit is shorter. With this, the distance measurement device according to the fourteenth aspect of the invention can derive the distance to the subject with proper light receiving sensitivity not affected by noise of ambient light.

According to a fifteenth aspect of the invention, in the distance measurement device according to any one of the first to fourteenth aspects of the invention, the emission unit may be able to adjust the emission intensity of the directional light and may adjust the emission intensity based on subject brightness or exposure state specification information to emit the directional light. With this, the distance measurement device according to the fifteenth aspect of the invention can derive the distance to the subject with proper emission intensity not affected by noise of ambient light.

According to a sixteenth aspect of the invention, in the distance measurement device according to the fifteenth aspect of the invention, the emission unit may make the emission intensity lower when the subject brightness is lower or exposure indicated by the exposure state specification information is higher. With this, the distance measurement device according to the sixteenth aspect of the invention can derive the distance to the subject with proper emission intensity not affected by noise of ambient light.

According to a seventeenth aspect of the invention, in the distance measurement device according to any one of the first to sixteenth aspects of the invention, a distance measurement by the emission unit, the light receiving unit, and the derivation unit may be performed a number of times determined in advance according to subject brightness or exposure state specification information. With this, the distance measurement device according to the seventeenth aspect of the invention can obtain a distance measurement result, in which the influence of noise of ambient light is moderated, compared to a case where the light emission frequency of directional light is fixed regardless of subject brightness.

According to an eighteenth aspect of the invention, in the distance measurement device according to the seventeenth aspect of the invention, a distance measurement by the emission unit, the light receiving unit, and the derivation unit may be performed a larger number of times when the subject brightness is higher or when the exposure indicated by the exposure state specification information is lower. With this, the distance measurement device according to the eighteenth aspect of the invention can obtain a distance measurement result, in which the influence of noise of ambient light is moderated, compared to a case where the light emission frequency of directional light is fixed regardless of high subject brightness.

According to a nineteenth aspect of the invention, in the distance measurement device according to any one of the first to eighteenth aspect of the invention, in a case of performing the actual exposure by the imaging unit, the emission of the directional light by the emission unit and the light reception by the light receiving unit may be paused. With this, the distance measurement device according to the nineteenth aspect of the invention can prevent noise caused by directional light from being superimposed on a captured image.

A distance measurement method according to a twentieth aspect of the invention comprises causing an imaging unit to capture a subject image formed by an imaging optical system forming the subject image indicating a subject, displaying the captured subject image on a display unit as a motion image, emitting directional light as light having directivity along an optical axis direction of the imaging optical system, receiving reflected light of the directional light from the subject, performing a distance measurement to derive a distance to the subject based on the timing at which the directional light is emitted and the timing at which the reflected light is received, and performing control such that transition is made to a state where actual exposure by the imaging unit is possible at the timing of the end of the distance measurement. With this, the distance measurement method according to the twentieth aspect of the invention can perform the distance measurement while confirming the subject even if still image capture is performed.

A distance measurement program according to a twenty-first aspect of the invention causes a computer to execute processing including, in a case of performing a distance measurement to derive a distance to a subject based on the timing at which directional light is emitted by an emission unit emitting the directional light along an optical axis direction of an imaging optical system forming a subject image indicating the subject and the timing at which reflected light is received by a light receiving unit receiving the reflected light of the directional light from the subject, displaying the subject image captured by an imaging unit capturing the subject image on a display unit as a motion image and transitioning to a state where actual exposure by the imaging unit is possible at the timing of the end of the distance measurement. With this, the distance measurement program according to the twenty-first aspect of the invention can perform the distance measurement while confirming the subject even if still image capture is performed.

According to a twenty-second aspect of the invention, there is provided a non-transitory computer-readable storage medium storing a distance measurement program, the distance measurement program causing a computer to execute distance measurement processing, and the distance measurement processing including causing an imaging unit to capture a subject image formed by an imaging optical system forming the subject image indicating a subject, displaying the captured subject image on a display unit as a motion image, emitting directional light as light having directivity along an optical axis direction of the imaging optical system, receiving reflected light of the directional light from the subject, performing a distance measurement to derive a distance to the subject based on the timing at which the directional light is emitted and the timing at which the reflected light is received, and performing control such that transition is made to a state where actual exposure by the imaging unit is possible at the timing of the end of the distance measurement. With this, in the storage medium according to the twenty-second aspect of the invention, it is possible to perform the distance measurement while confirming the subject even if still image capture is performed.

According to the technique of the present disclosure, it is possible to perform a distance measurement while confirming a subject.

BRIEF DESCRIPTION OF THE DRAWINGS

FIG. 1 is a block diagram showing an example of the configuration of a main part of a distance measurement device according to an embodiment.

FIG. 2 is a timing chart showing an example of the timing of a distance measurement operation to measure a distance to a subject in the distance measurement device according to the embodiment.

FIG. 6 is a flowchart showing an example of a flow of distance measurement processing which is executed by a distance measurement control unit in a case where the distance measurement imaging start button is provided in the operating unit in the distance measurement device according to the embodiment.

FIG. 7 is a flowchart showing an example of a flow of control processing which is executed by the main control unit in a case where a release button is provided in the operating unit in the distance measurement device according to the embodiment.

DETAILED DESCRIPTION

Figure 3:
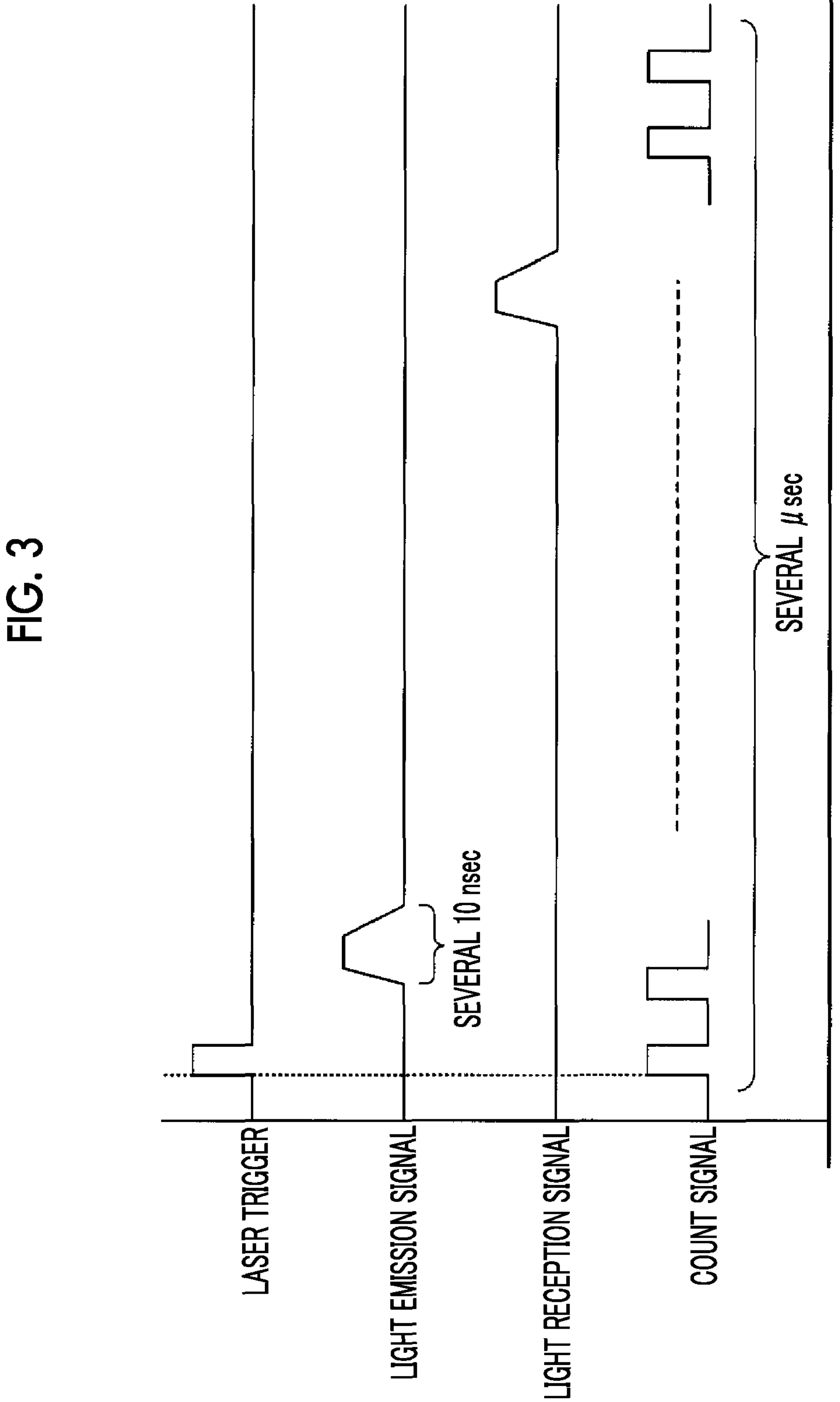
FIG. 3 is a timing chart showing an example of the timing from light emission to light reception in a single measurement in the distance measurement device of the embodiment.

Hereinafter, an example of an embodiment of a distance measurement device of the present disclosure will be described referring to the accompanying drawings. In this embodiment, a measurement of a distance to a subject to be a measurement target is referred to as a "distance measurement".

First, the configuration of the distance measurement device according to this embodiment will be described. FIG. 1 is a block diagram showing the configuration of a main part of a distance measurement device 10 according to this embodiment.

The distance measurement device 10 of this embodiment has a function of performing a distance measurement and a function of imaging a subject to generate a captured image indicating the subject. The distance measurement device 10 of this embodiment comprises a control unit 20, a light emitting lens 30, a laser diode 32, a light receiving lens 34, a photodiode 36, an imaging optical system 40, an imaging element 42, an operating unit 44, a view finder 46, and a storage unit 48.

The control unit 20 comprises a time counter 22, a distance measurement control unit 24, and a main control unit 26. The time counter 22 has a function of generating a count signal in each given period determined in advance according to a signal (for example, a clock pulse) input from the main control unit 26 through the distance measurement control unit 24.

The distance measurement control unit 24 has a function of performing a distance measurement under the control of the main control unit 26. The distance measurement control unit 24 of this embodiment controls the driving of the laser diode 32 at the timing according to the count signal generated by the time counter 22 to perform the distance measurement. The distance measurement control unit 24 functions as a derivation unit. Specific examples of the distance measurement control unit 24 include an application specific integrated circuit (ASIC), a field-programmable gate array (FPGA), and the like. The distance measurement control unit 24 of this embodiment has a storage unit (not shown). Specific examples of the storage unit in the distance measurement control unit 24 include a nonvolatile storage unit, such as a read only memory (ROM), and a volatile storage unit, such as a random access memory (RAM).

The main control unit 26 has a function of controlling the entire distance measurement device 10. The main control unit 26 of this embodiment has a function of controlling the imaging optical system 40 and the imaging element 42 to image a subject and generating a captured image (subject image). The main control unit 26 functions as a control unit and a brightness detection unit. Specific examples of the main control unit 26 include a central processing unit (CPU) and the like. The main control unit 26 of this embodiment has a storage unit (not shown). Specific examples of the storage unit in the main control unit 26 include a nonvolatile storage unit, such as a ROM, and a volatile storage unit, such as a RAM. A program of control processing described below is stored in the ROM in advance.

A program of control processing is not necessarily stored in the main control unit 26 from the beginning. For example, a control program may be stored in advance in an arbitrary portable storage medium, such as a solid state drive (SSD), a CD-ROM, a DVD disk, a magneto-optical disk, or an IC card. The distance measurement device 10 may acquire the control program from the portable storage medium storing the program and may store the control program in the main control unit 26 or the like. Furthermore, the distance measurement device 10 may acquire the control program from other external devices through the Internet or a local area network (LAN) and may store the control program in the main control unit 26 or the like.

The operating unit 44 is a user interface which is operated by the user when various instructions are provided to the distance measurement device 10. The operating unit 44 may include a distance measurement imaging start button for instructing the start time of a distance measurement and imaging, and buttons, keys, or the like (all of these are not shown) for performing various instructions, or may include a release button, and buttons, keys, or the like (all of these are not shown) for performing various instructions. Various instructions received by the operating unit 44 are output to the main control unit 26 as operation signals, and the main control unit 26 executes processing according to the operation signals input from the operating unit 44. The operating unit 44 may include a distance measurement instruction button for instructing only a distance measurement, other than the above.

In a case where the distance measurement imaging start button is provided in the operating unit 44, the distance measurement imaging start button instructs the start of a distance measurement of the subject and still image capture. In a case where the release button is provided in the operating unit 44, the release button detects a two-stage pressing operation of an imaging preparation instruction state and an imaging instruction state. The imaging preparation instruction state indicates, for example, a state of being pressed from a standby position to an intermediate position (half-pressing position), and the imaging instruction state indicates a state of being pressed to a final pressing position (fully pressing position) beyond the intermediate position. Hereinafter, "the state of being pressed from the standby position to the half-pressing position" refers to a "half-pressing state", and "the state of being pressed from the standby position or the half-pressing position to the fully pressing position" refers to a "fully pressing state".

In the distance measurement device 10 according to this embodiment, a manual focus mode and an auto-focus mode are selectively set according to a user's instruction. In the auto-focus mode, in a case where the distance measurement imaging start button is provided in the operating unit 44, adjustment of imaging conditions is performed by operating the distance measurement imaging start button to perform a distance measurement and imaging. Specifically, the main control unit 26 controls the imaging optical system 40 by operating the distance measurement imaging start button, whereby an automatic exposure (AE) function is operated to perform exposure adjustment. After the exposure adjustment, an auto-focus (AF) function is operated to perform focus adjustment, subsequently, a distance measurement is performed, and then, imaging is performed. In a case where the release button is provided in the operating unit 44, the adjustment of the imaging conditions is performed by bringing the release button into the half-pressing state to perform a distance measurement. Thereafter, exposure (imaging) is performed by successively bringing the release button into the fully pressing state. That is, if the release button of the operating unit 44 is brought into the half-pressing state, the AE function is operated to perform exposure adjustment and a distance measurement, and the AF function is operated to perform focus adjustment, and if the release button is brought into the fully pressing state, imaging is performed.

The storage unit 48 primarily stores image data obtained by imaging, and a nonvolatile memory is used therefor. Specific examples of the storage unit 48 include a flash memory or a hard disk drive (HDD).

The view finder 46 has a function of displaying images, character information, and the like. The view finder 46 of this embodiment is an electronic view finder, and is used for displaying a live view image (through-image) as an example of a continuous-frame image obtained by imaging in continuous frames during imaging. The view finder 46 is also used for displaying a still image as an image of a single-frame image obtained by imaging in a single frame in a case where an instruction to capture a still image is provided. In addition, the view finder 46 is also used for displaying a reproduced image in a reproduction image or displaying a menu screen or the like.

The imaging optical system 40 comprises an imaging lens including a focus lens, a motor, a slide mechanism, and a shutter (all of these are not shown). The slide mechanism moves the focus lens along the optical axis direction (not shown) of the imaging optical system 40. The focus lens is attached so as to be slidable along the optical axis direction of the slide mechanism. The motor is connected to the slide mechanism, and the slide mechanism receives power of the motor and slides the focus lens along the optical axis direction. The motor is connected to the main control unit 26 of the control unit 20, and is controlled and driven according to a command from the main control unit 26. In the distance measurement device 10 of this embodiment, as a specific example of the motor, a stepping motor is applied. Accordingly, the motor is operated in synchronization with pulse power in response to a command from the main control unit 26.

In the distance measurement device 10 according to this embodiment, in the auto-focus mode, the main control unit 26 performs focus adjustment by driving and controlling the motor of the imaging optical system 40 at a position where a contrast value of an image obtained by imaging with the imaging element 42 becomes the maximum. Furthermore, in the auto-focus mode, the main control unit 26 calculates AE information which is a physical quantity indicating brightness of an image obtained by imaging. The main control unit 26 derives a shutter speed and an F-number (aperture value) according to the brightness of the image indicated by the AE information in a case where the release button of the operating unit 44 is brought into the half-pressing state. The main control unit 26 performs exposure adjustment by controlling respective related units in a state of becoming the derived shutter speed and F-number.

The imaging element 42 is an imaging element comprising color filters (not shown), and functions as an imaging unit. In this embodiment, as an example of the imaging element 42, a CMOS type image sensor is used. The imaging element 42 is not limited to a CMOS type image sensor, and may by, for example, a CCD image sensor. The color filters include a G filter corresponding green (G) most contributing to obtaining a brightness signal, an R filter corresponding to red (R), and a B filter corresponding to blue (B). Any filter of "R", "G", and "B" included in the color filters is allocated to each of the pixels (not shown) of the imaging element 42.

In a case of imaging a subject, image light indicating the subject is formed on the light receiving surface of the imaging element 42 through the imaging optical system 40. The imaging element 42 has a plurality of pixels (not shown) arranged in a matrix in a horizontal direction and a vertical direction, and signal charges according to image light are stored in the pixels of the imaging element 42. The signal charges stored in the pixels of the imaging element 42 are sequentially read as digital signals according to the signal charges (voltages) under the control of the main control unit 26.

The imaging element 42 has a so-called electronic shutter function, and operates the electronic shutter function to control an electric charge storage time (shutter sped) of each photosensor at the timing under the control of the main control unit 26.

The imaging element 42 outputs the digital signals indicating the pixel values of the captured image from the respective pixels. The captured image output from the respective pixels is a chromatic image, and is, for example, a color image having the same color arrangement as the pixel arrangement. The captured image (frames) output from the imaging element 42 is temporarily stored (overwritten and saved) in the storage unit of the main control unit 26 or a RAW image storage area (not shown) of the storage unit 48 determined in advance through the main control unit 26.

The main control unit 26 subjects the frames to various kinds of image processing. The main control unit 26 has a white balance (WB) gain unit, a gamma correction unit, and a synchronization processing unit (all of these are not shown), and sequentially performs signal processing for the original digital signals (RAW images) temporarily stored in the main control unit 26 or the like in each processing unit. That is, the WB gain unit executes white balance (WB) adjustment by adjusting the gain of each of R, G, and B signals. The gamma correction unit performs gamma correction of each of the R, G, and B signals subjected to the WB adjustment in the WB gain unit. The synchronization processing unit performs color interpolation processing corresponding to the arrangement of the color filters of the imaging element 42 and generates the synchronized R, G, and B signals. Each time the RAW image for one screen is acquired by the imaging element 42, the main control unit 26 performs image processing for the RAW image in parallel.

The main control unit 26 outputs image data of the generated captured image for recording to an encoder (not shown), which converts an input signal to a signal in a different format. The R, G, and B signals processed by the main control unit 26 are converted (encoded) to signals for recording by the encoder, and the signals for recording are recorded in the storage unit 48. The captured image for display processed by the main control unit 26 is output to the view finder 46.

The main control unit 26 of this embodiment displays a live view image on the view finder 46 by performing control for continuously displaying the captured images for display as a motion image.

The light emitting lens 30 and the laser diode 32 function as an example of an emission unit. The laser diode 32 is driven based on an instruction from the distance measurement control unit 24 and has a function of emitting a laser beam toward the subject to be a measurement target through the light emitting lens 30 in the optical axis direction of the imaging optical system 40. Specific examples of the light emitting lens 30 of this embodiment include an objective lens or the like. The laser beam emitted from the laser diode 32 is an example of directional light according to the technique of the present disclosure.

The light receiving lens 34 and the photodiode 36 function as an example of a light receiving unit. The photodiode 36 has a function of receiving the laser beam emitted from the laser diode 32 and reflected from the subject through the light receiving lens 34 and outputting an electrical signal according to the amount of received light to the distance measurement control unit 24.

If the user provides an instruction for a distance measurement using the distance measurement imaging start button, the release button, or the distance measurement instruction button, or the like of the operating unit 44, the main control unit 26 instructs the distance measurement control unit 24 for a distance measurement. Specifically, in this embodiment, the main control unit 26 instructs the distance measurement control unit 24 to start a distance measurement by transmitting a distance measurement instruction signal to the distance measurement control unit 24. In a case of performing a measurement of a distance to a subject and imaging of the subject together, the main control unit 26 transmits a synchronization signal for synchronizing a distance measurement operation and an imaging operation to the distance measurement control unit 24 as the distance measurement instruction signal.

If the distance measurement instruction signal are received, the distance measurement control unit 24 controls the light emission of the laser diode 32 at the timing according to the count signal of the time counter 22 and controls the timing of emitting a laser beam toward the subject. The distance measurement control unit 24 samples the electric signal according to the amount of received light output from the photodiode 36 at the timing according to the count signal of the time counter 22.

The distance measurement control unit 24 derives the distance to the subject based on the light emission timing at which the laser diode 32 emits a laser beam and the light reception timing at which the photodiode 36 receives the laser beam, and outputs distance data representing the derived distance to the main control unit 26. The main control unit 26 displays information relating to the distance to the subject on the view finder 46 based on distance data. The main control unit 26 stores distance data in the storage unit 48.

Figure 2:
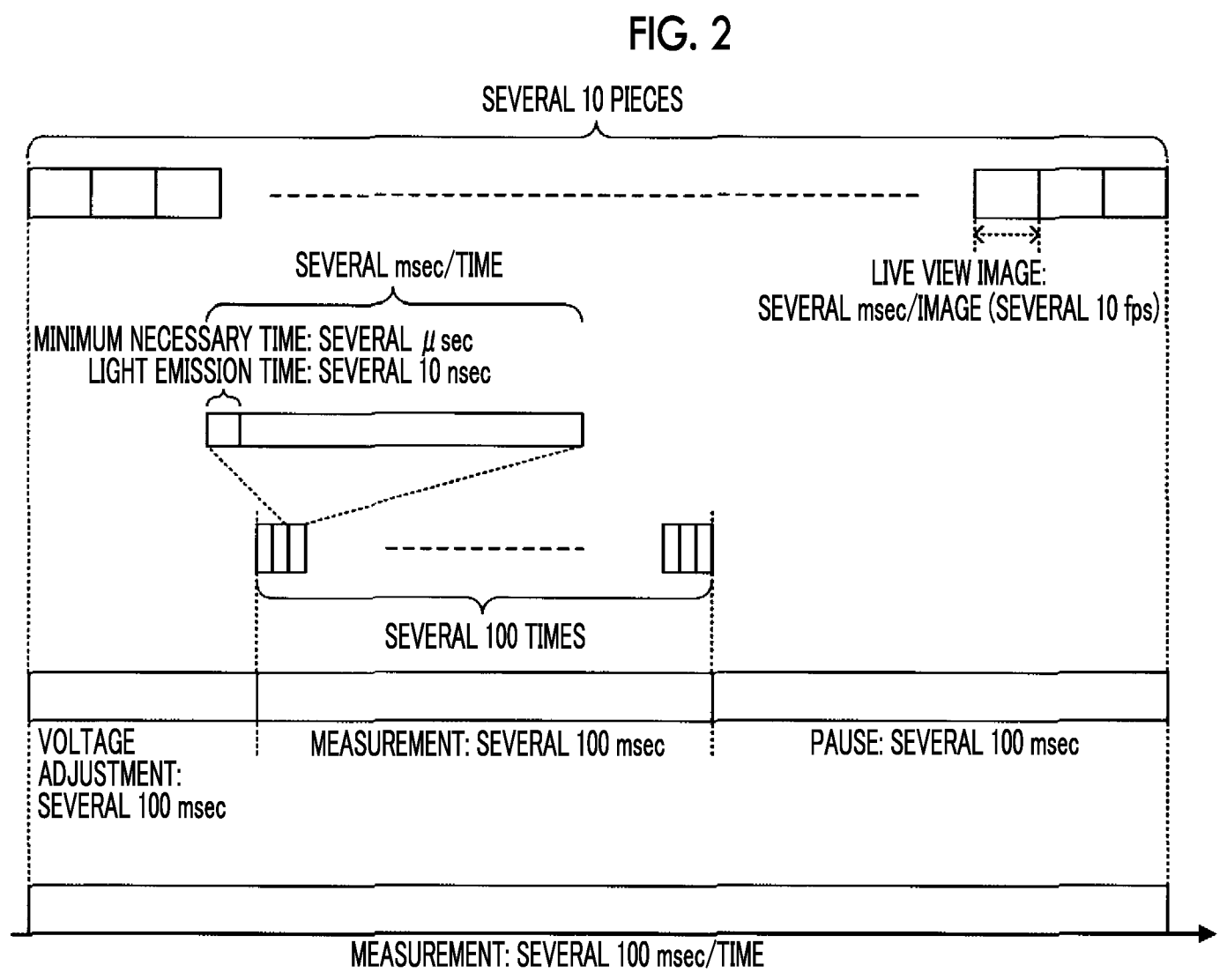

The measurement of the distance to the subject by the distance measurement control unit 24 will be described in more detail. FIG. 2 is a timing chart showing an example of the timing of the distance measurement operation in the measurement of the distance to the subject in the distance measurement device 10.

In the distance measurement device 10 of this embodiment, a single distance measurement (measurement) sequence includes a voltage adjustment period, an actual measurement period, and a pause period. The voltage adjustment period refers to a period during which a drive voltage of the laser diode 32 and the photodiode 36 is adjusted to an appropriate voltage value. As a specific example, in the distance measurement device 10 of this embodiment, as shown in FIG. 2, the voltage adjustment period is set to several 100 msec (milliseconds).

The actual measurement period refers to a period in which the distance to the subject is actually measured. In the distance measurement device 10 of this embodiment, as a specific example, as shown in FIG. 2, the distance to the subject is measured by repeating an operation to emit a laser beam and to receive the laser beam reflected from the subject several 100 times and measuring the elapsed time from light emission to light reception. That is, in the distance measurement device 10 of this embodiment, in the single measurement sequence, the measurement of the distance to the subject is performed several 100 times.

FIG. 3 is an example of a timing chart showing the timing from light emission to light reception in a single measurement. In a case of performing a distance measurement, the distance measurement control unit 24 outputs a laser trigger for causing the laser diode 32 to emit light according to the count signal of the time counter 22 to the laser diode 32. The laser diode 32 emits light according to the laser trigger. In the distance measurement device 10 of this embodiment, as a specific example, the light emission time of the laser diode 32 is set to several 10 nsec (nanoseconds). The emitted laser beam is emitted toward the subject through the light emitting lens 30 in the optical axis direction of the imaging optical system 40. The laser beam emitted from the distance measurement device 10 is reflected from the subject and reaches the distance measurement device 10. The photodiode 36 of the distance measurement device 10 receives the reflected laser beam through the light receiving lens 34.

In the distance measurement device 10 of this embodiment, as a specific example, the distance measurement device performs a distance measurement for a subject within several km from the distance measurement device 10. The time until the laser beam emitted from the laser diode 32 toward the subject several km ahead through the light emitting lens 30 is returned (received) becomes several km×2/light speed≅several μsec (microseconds). Accordingly, in order to measure the distance to the subject several km ahead, as an example, as shown in FIG. 2, the time of at least several μsec is required.

In the distance measurement device 10 of this embodiment, the reciprocation time or the like of the laser beam is considered, and as a specific example, a single measurement time is set to several msec as shown in FIG. 2. Since the reciprocation time of the laser beam is different depending on the distance to the subject, the measurement time for each time may be different depending on the distance assumed by the distance measurement device 10.

Figure 4:
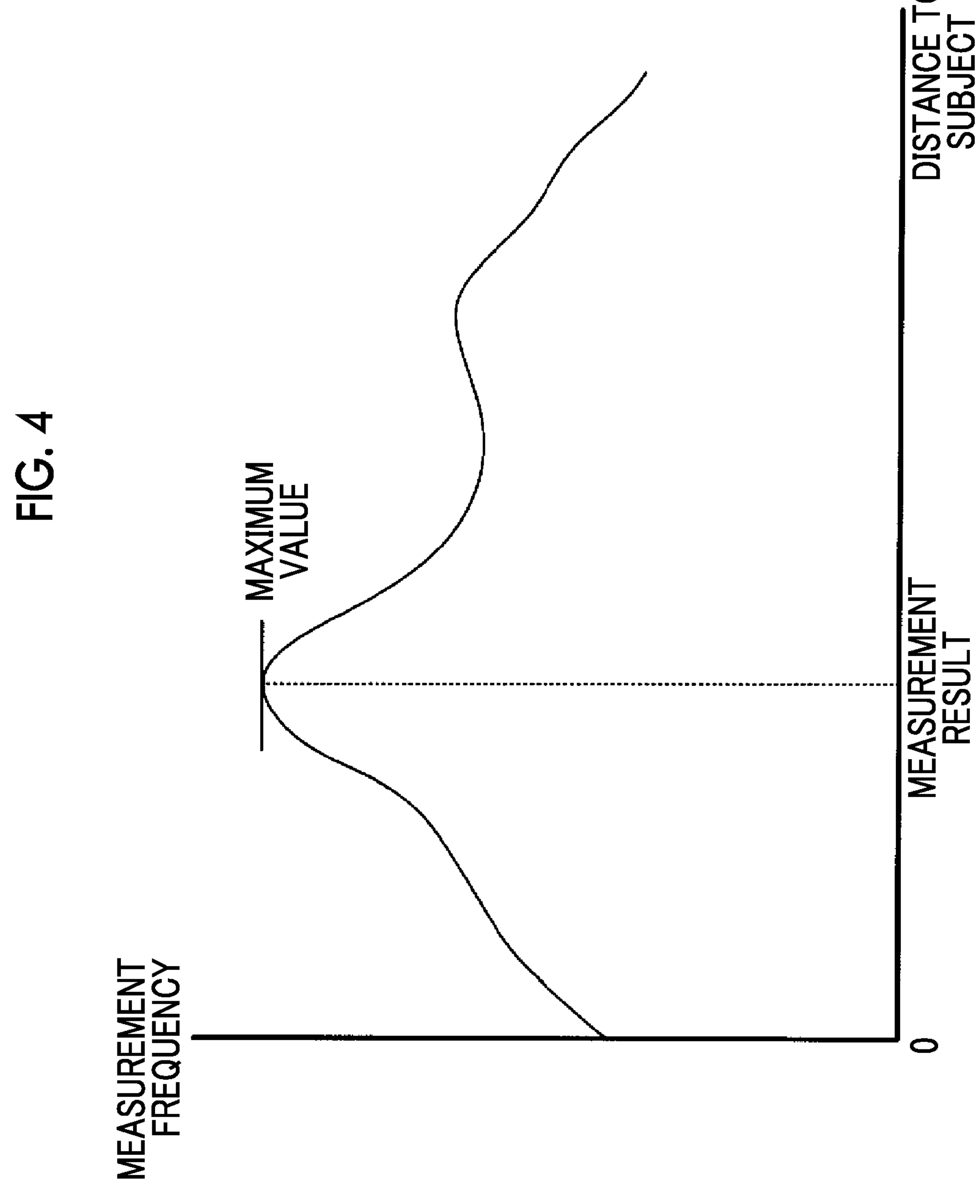
FIG. 4 is a graph showing an example of a histogram of measured values in a case where a distance to a subject is set as a horizontal axis and a measurement frequency is set as a vertical axis.

In the distance measurement device 10, the distance measurement control unit 24 derives the distance to the subject based on measured values obtained by performing a measurement several 100 times as described above. In the distance measurement control unit 24 of this embodiment, as a specific example, a histogram of measured values for several 100 times is analyzed to derive the distance to the subject. FIG. 4 is a graph showing an example of a histogram of measured values in a case where the distance to the subject is set as a horizontal axis and the measurement frequency is set as a vertical axis. The distance measurement control unit 24 derives the distance to the subject corresponding to a maximum value of the measurement frequency in the above-described histogram as a measurement result and outputs distance data indicating the derived measurement result to the main control unit 26. A histogram may be generated based on the reciprocation time (the elapsed time from light emission to light reception) of the laser beam or ½ of the reciprocation time of the laser beam, or the like, instead of the distance to the subject.

The pause period refers to a period for pausing the driving of the laser diode 32 and the photodiode 36. In the distance measurement device 10 of this embodiment, as a specific example, as shown in FIG. 2, the pause period is set to several 100 msec.

In the distance measurement device 10 of this embodiment, the single measurement time is set to several 100 msec.

The main control unit 26 of the distance measurement device 10 of this embodiment displays a live view image on the view finder 46 as described above. The main control unit 26 performs the display of the live view image by displaying the captured images captured in several 10 fps (several 10 msec/image) on the view finder 46 as a motion image. For this reason, during the single measurement period, live view images for several 10 are displayed on the view finder 46.

The live view image is displayed on the view finder 46 in this way, whereby it is possible to perform the distance measurement while confirming the subject. However, if transition is made to a state where the actual exposure is possible for still image capture before the distance measurement to the subject is finished, the live view image cannot be temporarily displayed. For this reason, it is not possible to perform the distance measurement while confirming the subject.

Accordingly, in the distance measurement device 10 according to this embodiment, in a case of performing the distance measurement, the live view image is displayed on the view finder 46. Then, the main control unit 26 performs control such that transition is made to a state where the actual exposure for still image capture is possible at the timing of the end of the distance measurement. Here, "the timing of the end of the distance measurement" indicates the end timing of all of several 100 of measurements of the emission and the reception of the laser beam for the distance measurement, the timing of the end of the measurement, the timing of deriving the distance after the measurement, or the timing before and after the end of derivation of the distance.

Next, an imaging operation and a distance measurement operation in the distance measurement device 10 of this embodiment will be described. In the following description, an imaging operation and a distance measurement operation in a case of performing an imaging operation and a distance measurement operation to capture a still image will be described.

Figure 5:
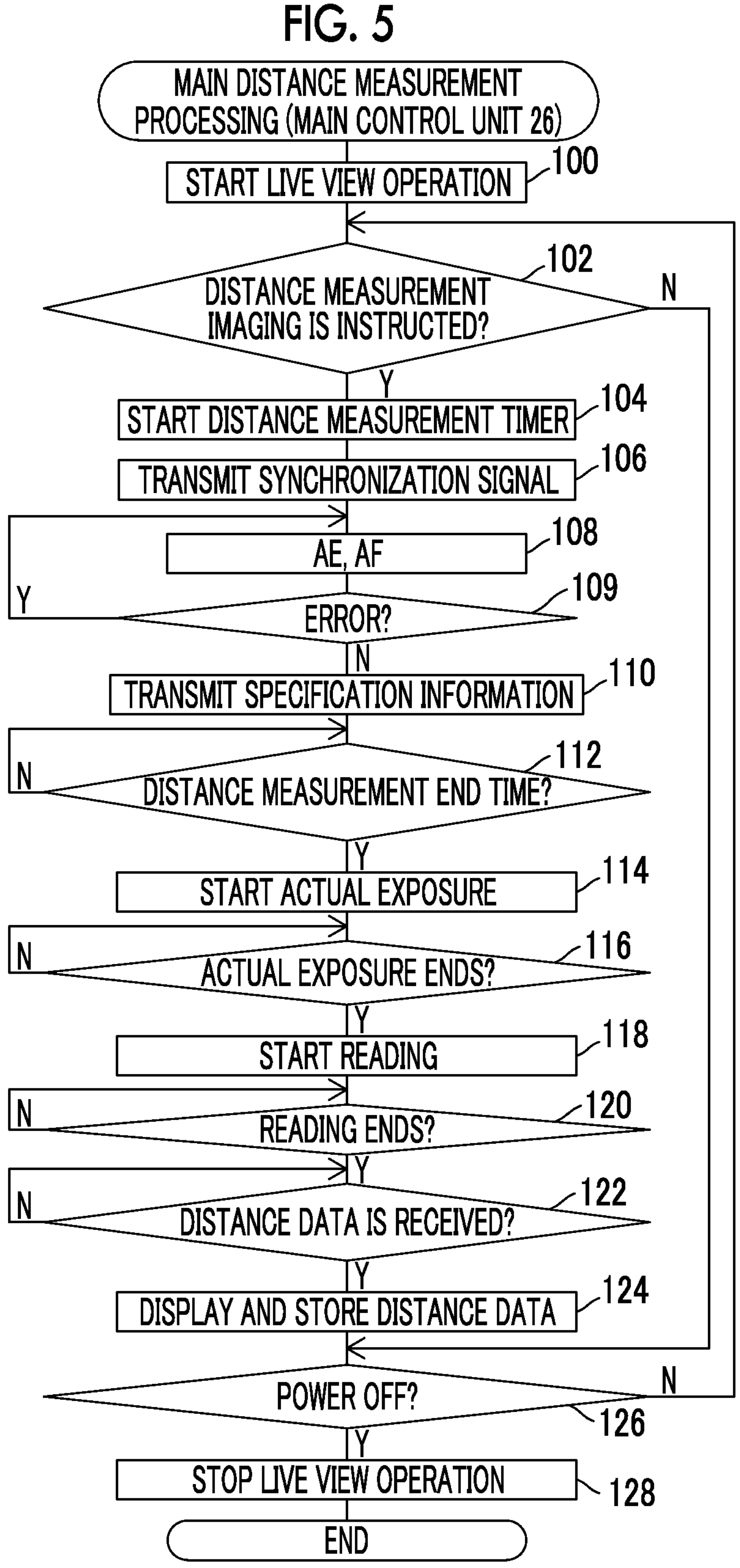
FIG. 5 is a flowchart showing an example of a flow of control processing which is executed by a main control unit in a case where a distance measurement imaging start button is provided in an operating unit in the distance measurement device according to the embodiment.

First, control processing which is executed by the main control unit 26 in a case where a distance measurement imaging start button is provided in the operating unit 44. FIG. 5 is a flowchart showing an example of a flow of control processing which is executed by the main control unit 26 in a case where the distance measurement imaging start button is provided in the operating unit 44 in the distance measurement device 10 of this embodiment. The flowchart shown in FIG. 5 is executed if power is supplied to the distance measurement device 10.

First, in Step 100, the main control unit 26 starts a live view operation. As described above, the main control unit 26 displays the live view image on the view finder 46 by performing control for continuously displaying the captured images obtained by the imaging optical system 40 and the imaging element 42 as a motion image.

Next, in Step 102, the main control unit 26 determines whether or not the distance measurement imaging start button of the operating unit 44 is operated. In a case where the distance measurement imaging start button is not operated, the process progresses to Step 126. In a case where the distance measurement imaging start button is operated, the process progresses to Step 104.

In Step 104, the main control unit 26 starts a distance measurement timer. The distance measurement timer is a timer for measuring the timing of the end of the distance measurement, and measures a predetermined time required for several 100 of measurements described above. The distance measurement timer is a timer for measuring the timing the end of the distance measurement, and may measure the time corresponding to a period toward the end of several 100 times, not the time until several 100 of measurements completely end. Alternatively, the time until the timing before and after the end of a derivation period for deriving the distance after several 100 of measurements end may be measured.

Next, in Step 106, the main control unit 26 transmits the synchronization signal to the distance measurement control unit 24. In the distance measurement device 10 of this embodiment, In order to synchronize the imaging operation by the main control unit 26 and the distance measurement operation by the distance measurement control unit 24, the synchronization signal is transmitted from the main control unit 26 to the distance measurement control unit 24 prior to the start of imaging (the actual exposure to the imaging element 42). Though details will be described below, in the distance measurement control unit 24, if the synchronization signal is received, the distance measurement operation (the measurement of the distance to the subject) starts.

Next, in Step 108, the main control unit 26 controls the imaging optical system 40 and performs AE and AF as described above. In the distance measurement device 10, exposure adjustment is performed by performing AE, focus adjustment is performed by performing AF, and image light indicating the subject is formed on the light receiving surface of the imaging element 42 in a focused state.

Next, in Step 109, the main control unit 26 determines whether or not an error of AE or AF occurs. In a case where an error occurs, the determination is affirmative and the process returns to Step 108. In a case where no error occurs, the determination is negative and the process progresses to Step 110.

In Step 110, the main control unit 26 transmits exposure state specification information for specifying an exposure state at the present time as a result of AE to the distance measurement control unit 24. In Step 110, the main control unit 26 also transmits focusing state specification information for specifying a focusing state at the present time as a result of AF to the distance measurement control unit 24. Examples of the exposure state specification information include an F-number and a shutter speed uniquely determined according to subject brightness, an F-number and a shutter speed derived from a so-called AE evaluation value uniquely determined according to subject brightness, or the like. Other examples of the exposure state specification information include an AE evaluation value. Examples of the focusing state specification information include the subject distance obtained by AF. Hereinafter, for convenience of description, in a case where there is no need for distinction between the exposure state specification information and the focusing state specification information, these are referred to as "specification information".

Next, in Step 112, the main control unit 26 determines whether or not a distance measurement end time is reached. That is, it is determined whether or not the distance measurement timer times up. The main control unit 26 is in a standby state until the distance measurement end time is reached, and in a case where the distance measurement end time is reached, progresses to Step 114. That is, in a case where the distance measurement end time is reached, the emission of the laser diode 32 and the reception of the photodiode 36 are paused.

In Step 114, the main control unit 26 starts the actual exposure (imaging). With the start of the actual exposure, the pixels of the imaging element 42 are irradiated with light (image light is formed on the light receiving surface of the imaging element 42), and signal charges according to irradiated light are stored in the respective pixels. That is, in a case where the distance measurement end time is reached, since the light emission of the laser diode 32 and the reception of the photodiode 36 are paused, it is possible to prevent noise caused by the laser beam from being superimposed on a captured image even if the actual exposure is performed.

Next, in Step 116, the main control unit 26 detects whether or not the actual exposure ends. The main control unit 26 is in a standby state until the actual exposure ends, and in a case where the actual exposure ends, progresses to Step 118. A determination method regarding whether or not the actual exposure ends is not limited, and as a specific example, a method which determines the end of the actual exposure by determining whether or not an actual exposure time determined under various conditions elapses is considered.

In Step 118, the main control unit 26 starts the reading of the signal charges stored in the respective pixels of the imaging element 42.

Next, in Step 120, the main control unit 26 determines whether or not to end the reading. In a case where the signal charges are not yet read from all pixels of the imaging element 42, the main control unit 26 performs the determination of Step 120 again. In a case where the signal charges are read from all pixels of the imaging element 42, the process progresses to Step 122.

Next, in Step 122, the main control unit 26 determines whether or not distance data is received. Though details will be described below, if the distance measurement is performed, the distance measurement control unit 24 transmits distance data indicating a distance measurement result (finally derived distance) to the main control unit 26. The main control unit 26 is in a standby state until distance data transmitted from the distance measurement control unit 24 is received, and in a case where distance data is received, progresses to Step 124.

In Step 124, the main control unit 26 displays information relating to the distance to the subject on the view finder 46 based on received distance data so as to be superimposed on a live view image. The main control unit 26 stores received distance data in the storage unit 48 in correlation with a captured image obtained by imaging. With this step, the captured image (image data indicating the captured image) obtained by imaging the subject and the distance (distance data) to the subject are stored in the storage unit 48 in correlation with each other.

In Step 126, the main control unit 26 determines whether or not a power switch (not shown) is turned off. In a case where the power switch is not turned off, the process returns to Step 102, and this processing is repeated. In a case where the power supply is turned off, the process progresses to Step 128.

In Step 128, the main control unit 26 stops the live view operation, and then, ends this processing. The main control unit 26 turns off the power supply of the distance measurement device 10.

Next, distance measurement processing which is executed by the distance measurement control unit 24 in a case where a distance measurement imaging start button is provided in the operating unit 44 will be described. FIG. 6 is a flowchart showing an example of a flow of distance measurement processing which is executed by the distance measurement control unit 24 in a case where the distance measurement imaging start button is provided in the operating unit 44 in the distance measurement device 10 of this embodiment. The flowchart shown in FIG. 6 is executed if power is supplied to the distance measurement device 10.

First, in Step 150, the distance measurement control unit 24 determines whether or not the synchronization signal is received. Specifically, the distance measurement control unit 24 determines whether or not the synchronization transmitted from the main control unit 26 in Step 106 of the control processing in the main control unit 26 described above is received. The distance measurement control unit 24 is in a standby state until the synchronization signal is received, and if the synchronization signal is received, the process progresses to Step 152.

In Step 152, the distance measurement control unit 24 determines whether or not the specification transmitted in Step 110 of the control processing described above is received. In Step 152, in a case where the specification information is not received, the determination is negative, and the distance measurement control unit 24 performs the determination of Step 152 again. In Step 152, in a case where the specification information is received, the determination is affirmative and the process progresses to Step 154.

In Step 154, the distance measurement control unit 24 determines the effective distance measurement range (an example of a distance range according to the present disclosure) based on the focusing state specification information received in Step 152. For example, the distance measurement control unit 24 determines the effective distance measurement range with reference to a range derivation table (not shown) in which the effective distance measurement range is uniquely derived from the focusing state specification information.

The effective distance measurement range is a distance range which is used when determining the frequency of each of the distances obtained by driving the distance to the subject multiple times. That is, the effective distance measurement range indicates an effective range of a distance to be derived in Step 170 described below and means the range of the subject distance and the vicinity thereof estimated from the focusing state specification information.

Examples of the range derivation table include a table in which a moving direction and a moving distance of a focus lens from a reference position determined in advance are correlated with an effective distance measurement range.

The moving direction and the moving distance are specified by the focusing state specification information.

The distance measurement control unit 24 may determine the effective distance measurement range using an arithmetic expression with the focusing state specification information as an independent variable and the effective distance measurement range as a dependent variable as without using the range derivation table.

Next, in Step 156, the distance measurement control unit 24 determines a derivation resolution uniquely determined from the effective distance measurement range determined in Step 154.

The derivation resolution is a resolution increased according to the effective distance measurement range determined in Step 154 and is set to be higher than a predetermined resolution. The predetermined resolution used herein indicates, for example, a resolution which is used in a case of performing a distance measurement (in a case of deriving the distance to the subject) without being bound by the effective distance measurement range. In this embodiment, as an example of the derivation resolution, a resolution which is set to be higher than the predetermined resolution using a number of bits (for example, 8 bits) determined in advance as the number of bits defining the predetermined resolution is used.

In this embodiment, although the effective distance measurement range is determined to set the derivation resolution, the distance measurement may be performed without determining the effective distance measurement range. That is, Step 110 in the main control unit 26 and Steps 154 and 156 in the distance measurement control unit 24 may be omitted.

Next, in Step 158, the distance measurement control unit 24 transitions to the voltage adjustment period and performs voltage adjustment of the drive voltage of the laser diode 32 and the photodiode 36, whereby the emission intensity of the laser beam of the laser diode 32 is adjusted and the light receiving sensitivity of the photodiode 36 is adjusted.

The emission intensity of the laser beam emitted from the laser diode 32 is adjusted based on the specification information received in Step 152. For example, the distance measurement control unit 24 adjusts the emission intensity of the laser beam with reference to an intensity setting table (not shown) in which voltage information indicating the drive voltage of the laser diode 32 is uniquely derived from the specification information. That is, the distance measurement control unit 24 derives the voltage information corresponding to the specification information received in Step 152 from the intensity setting table and performs the voltage adjustment such that the drive voltage indicated by the derived voltage information is applicable to the laser diode 32 (see FIG. 19).

Examples of the intensity setting table include a table in which voltage information representing the shorter a distance to a principal subject, the lower the emission intensity of the laser beam, and the smaller the amount of ambient light (the lower the subject brightness or the higher the exposure), the lower the emission intensity of the laser beam is stored. The distance to the principal subject is specified by the focusing state specification information, and the amount of ambient light is specified by the subject brightness or the exposure state specification information. Ambient light becomes noise for the laser beam, and this means that the smaller the amount of ambient light, the smaller the noise of the laser beam becomes. Accordingly, in Step 158, the distance measurement control unit 24 performs the voltage adjustment such that the emission intensity of the laser beam becomes small in a case where the amount of ambient light is small.

The distance measurement control unit 24 may adjust the emission intensity of the laser beam based on the voltage information derived by an arithmetic expression with the exposure state specification information and the focusing state specification information as independent variables and the voltage information as a dependent variable without using the intensity setting table.

Here, although a case where the emission intensity of the laser beam is adjusted based on the exposure state specification information and the focusing state specification information received in Step 152 has been illustrated, the embodiment is not limited thereto. For example, the emission intensity of the laser beam may be adjusted based on the exposure state specification information or the focusing state specification information.

The light receiving sensitivity of the photodiode 36 is adjusted based on the focusing state specification information received in Step 152. For example, the distance measurement control unit 24 adjusts the light receiving sensitivity of the photodiode 36 with reference to a sensitivity adjustment table (not shown) in which the voltage information indicating the drive voltage of the photodiode 36 is uniquely derived from the specification information. That is, the distance measurement control unit 24 derives the voltage information corresponding to the focusing state specification information received in Step 152 from the sensitivity adjustment table. Then, the voltage adjustment is performed such that the drive voltage indicated by the derived voltage information is applicable to the photodiode 36 (see FIG. 19).

Examples of the sensitivity adjustment table include a table in which voltage information representing the shorter the distance to the principal subject, the lower the light receiving sensitivity of the photodiode 36 is stored.

The distance measurement control unit 24 may set the light receiving sensitivity of the photodiode 36 based on voltage information derived by an arithmetic expression with the focusing state specification information as an independent variable and the voltage information as a dependent variable without using the sensitivity adjustment table.

In Step 160, the distance measurement control unit 24 determines whether or not the voltage adjustment ends. In this embodiment, as an example, as shown in FIG. 2, the voltage adjustment period is set to several 100 msec. For this reason, the distance measurement control unit 24 determines that the voltage adjustment ends in a case where several 100 msec have elapsed after the transition to the voltage adjustment period. Accordingly, the distance measurement control unit 24 determines that the voltage adjustment does not end and is in a standby state until several 100 msec have elapsed after the transition to the voltage adjustment period, and in a case where several 100 msec have elapsed, determines that the voltage adjustment ends and progresses to Step 164.

Next, in Step 164, the distance measurement control unit 24 causes the laser diode 32 to emit light such that a laser beam having emission intensity adjusted in Step 158 is emitted.

Next, in Step 166, the distance measurement control unit 24 determines whether or not a predetermined time has elapsed. Specifically, as described above, since the single measurement time is set to several msec, the distance measurement control unit 24 determines whether or not several msec have elapsed. In a case where the predetermined time (in this embodiment, several msec which are the single measurement time) has not elapsed, the process is in the standby state, and in a case where the predetermined time has elapsed, the process progresses to Step 168.

The laser diode 32 emits light through the processing of Step 164, whereby the laser beam is emitted toward the subject through the light emitting lens 30. The laser beam reflected from the subject is received by the photodiode 36 through the light receiving lens 34 until the predetermined time elapses. The distance measurement control unit 24 acquires the elapsed time from light emission to light reception in a case where the laser beam is received by the photodiode 36 and stores the elapsed time in the storage unit (for example, the RAM or the like in the distance measurement control unit 24).

For example, in a case where the subject moves, or the like, the elapsed time from light emission to light reception of the laser beam exceeds several msec, and the laser beam may not be returned (reflected light may not be received). In this case, a measurement error occurs. In a case where a measurement error occurs, the distance measurement control unit 24 stores the effect in the storage unit (for example, the RAM or the like in the distance measurement control unit 24). Then, the occurrence of the measurement error may be displayed on the view finder 46 or the like according to the frequency of the occurrence of the measurement error, for example, if the frequency is not negligible in deriving the distance to the subject using a histogram. In this way, in a case where a measurement error occurs, the main control unit 26 may not store the captured image in the storage unit 48. In this case, the user can set whether or not to store the captured image.

Next, in Step 168, the distance measurement control unit 24 determines whether or not a predetermined number of measurements end. In Step 168, in a case where a predetermined number of measurements end, the determination is affirmative, and the process progresses to Step 170. In Step 168, in a case where a predetermined number of measurements do not end, the determination is negative, and the process returns to Step 164. The predetermined number of measurements corresponds to several 100 of measurements.

In Step 170, first, the distance measurement control unit 24 derives the distance to the subject based on the time from when the laser beam is emitted through the processing of Step 164 until the photodiode 36 receives the laser beam. As an example, as shown in FIG. 4, the distance measurement control unit 24 generates a histogram of the derived distance to the subject with the predetermined resolution. Next, as an example, as shown in FIG. 4, the distance measurement control unit 24 reconstructs a histogram of the distance to the subject using the derivation resolution derived within the effective distance measurement range determined in the processing of Steps 154 and 156. The distance measurement control unit 24 analyzes the histogram within the effective distance measurement range and generates distance data representing the analyzed distance (in the example shown in FIG. 4, the distance having the maximum measurement frequency). Here, the distance represented by distance data is a final distance (final output) which is provided to the user.

The histogram generated with the derivation resolution is segmented in contrast to the histogram generated with the predetermined resolution. Accordingly, the distance obtained by analyzing the histogram is expressed in units of minute numerical values (units of smaller numerical values) in contrast to the distance obtained by analyzing the histogram generated with the predetermined resolution.

Next, in Step 172, the distance measurement control unit 24 transmits distance data generated in Step 170 to the main control unit 26, and then, the process progresses to Step 174.

In Step 174, the distance measurement control unit 24 determines whether or not conditions (end conditions) determined in advance as conditions for ending this distance measurement processing are satisfied. An example of the end conditions is a condition that an end instruction from the user is received by the operating unit 44. In Step 174, in a case where the end conditions are not satisfied, the determination is negative, and the process progresses to Step 150. In Step 174, in a case where the end conditions are satisfied, the determination is affirmative, and this distance measurement processing ends.

As described above, in the distance measurement device 10 according to this embodiment, in a case of performing the distance measurement to the subject, the live view image is displayed on the view finder 46, and transition is made to a state where the actual exposure is possible at the timing of the end of the distance measurement to perform still image capture. With this, it is possible to prevent the subject from becoming non-confirmable since the live view is not displayed during the distance measurement due to switching from live view imaging to still image capture at the start of the distance measurement.

Subsequently, control processing which is executed by the main control unit 26 in a case where a release button is provided in the operating unit 44 will be described. FIG. 7 is a flowchart showing an example of a flow of control processing which is executed by the main control unit 26 in a case where the release button is provided in the operating unit 44 in the distance measurement device 10 of this embodiment. The flowchart shown in FIG. 7 is executed if power is supplied to the distance measurement device 10. The same processing as that in the flowchart of FIG. 5 which is executed by the main control unit 26 in a case where the distance measurement imaging start button is provided in the operating unit 44 is represented by the same reference numeral.

First, in Step 100, the main control unit 26 starts the live view operation. As described above, the main control unit 26 performs control such that captured images captured by the imaging optical system 40 and the imaging element 42 are successively displayed as a motion image, thereby displaying a live view image on the view finder 46.

Next, in Step 101, the main control unit 26 determines whether or not the release button of the operating unit 44 is half-pressed. In a case where the release button is not half-pressed, for example, in a case where the release button is not pressed at all, or the like, the process progresses to Step 126. In a case where the release button is half-pressed, the process progresses to Step 104.

In Step 104, the main control unit 26 starts the distance measurement timer. The distance measurement timer is a timer for measuring the timing of the end of the distance measurement, and measures a predetermined time required for several 100 of measurements described above. The distance measurement timer is a timer for measuring the timing the end of the distance measurement, and may measure the time corresponding to a period toward the end of several 100 times, not the time until several 100 of measurements completely end. Alternatively, the time until the timing of the end of the derivation period for deriving the distance after several 100 of measurements end may be measured.

Next, in Step 106, the main control unit 26 transmits the synchronization signal to the distance measurement control unit 24. In this way, in the distance measurement device 10 of this embodiment, in order to synchronize the imaging operation by the main control unit 26 and the distance measurement operation by the distance measurement control unit 24, the synchronization signal is transmitted from the main control unit 26 to the distance measurement control unit 24 prior to the start of imaging (the actual exposure to the imaging element 42). Though details will be described below, in the distance measurement control unit 24, if the synchronization signal is received, the distance measurement operation (the measurement of the distance to the subject) starts.

Next, in Step 108, the main control unit 26 controls the imaging optical system 40 and performs AE and AF as described above. In the distance measurement device 10, exposure adjustment is performed by performing AE, focus adjustment is performed by performing AF, and image light indicating the subject is formed on the light receiving surface of the imaging element 42 in a focused state.

Next, in Step 109, the main control unit 26 determines whether or not an error of AE or AF occurs. In a case where an error occurs, the determination is affirmative and the process returns to Step 108. In a case where no error occurs, the determination is negative and the process progresses to Step 110.

In Step 110, the main control unit 26 transmits the exposure state specification information for specifying the exposure state at the present time as a result of AE to the distance measurement control unit 24. In Step 110, the main control unit 26 also transmits the focusing state specification information for specifying the focusing state at the present time as a result of AF to the distance measurement control unit 24.

Next, in Step 112, the main control unit 26 determines whether or not a distance end time is reached. That is, it is determined whether or not the distance measurement timer times up. The main control unit 26 is in a standby state until the distance measurement end time is reached, and in a case where the distance measurement end time is reached, progresses to Step 113.

Next, in Step 113, the main control unit 26 determines whether or not the release button of the operating unit 44 is fully pressed. In a case where the release button is not fully pressed, the process progresses to Step 115.

In Step 115, the main control unit 26 determines whether or not a pressing operation to the release button of the operating unit 44 is released. In a case where pressing is not released, the process returns to Step 113, and this processing is repeated. In a case where pressing is released, the process progresses to Step 122.

In a case where the release button is fully pressed, the process progresses from Step 113 to Step 114.

Next, in Step 114, the main control unit 26 starts the actual exposure (imaging). With the start of the actual exposure, the pixels of the imaging element 42 are irradiated with light (image light is formed on the light receiving surface of the imaging element 42), and signal charges according to irradiated light are stored in the respective pixels. That is, in a case where the distance measurement end time is reached and the release button is fully pressed, the emission of the laser diode 32 and the reception of the photodiode 36 are paused. Accordingly, it is possible to prevent noise caused by the laser beam from being superimposed on a captured image even if the actual exposure is performed.

Next, in Step 116, the main control unit 26 detects whether or not the actual exposure ends. The main control unit 26 is in a standby state until the actual exposure ends, and in a case where the actual exposure ends, progresses to Step 118. A determination method regarding whether or not the actual exposure ends is not limited, and as a specific example, a method which determines the end of the actual exposure by determining whether or not an actual exposure time determined under various conditions elapses is considered.

In Step 118, the main control unit 26 starts the reading of the signal charges stored in the respective pixels of the imaging element 42.

Next, in Step 120, the main control unit 26 determines whether or not to end the reading. In a case where the signal charges are not yet read from all pixels of the imaging element 42, the main control unit 26 performs the determination of Step 120 again. In a case where the signal charges are read from all pixels of the imaging element 42, the process progresses to Step 122.

Next, in Step 122, the main control unit 26 determines whether or not distance data is received. If the distance measurement is performed, the distance measurement control unit 24 transmits distance data indicating a distance measurement result (finally derived distance) to the main control unit 26. The main control unit 26 is in a standby state until distance data transmitted from the distance measurement control unit 24 is received, and in a case where distance data is received, progresses to Step 124.

In Step 124, the main control unit 26 displays information relating to the distance to the subject on the view finder 46 based on received distance data so as to be superimposed on a live view image. The main control unit 26 stores received distance data in the storage unit 48 in correlation with a captured image obtained by imaging. With this step, the captured image (image data indicating the captured image) obtained by imaging the subject and the distance (distance data) to the subject are stored in the storage unit 48 in correlation with each other.

In Step 126, the main control unit 26 determines whether or not a power switch (not shown) is turned off. In a case where the power switch is not turned off, the process returns to Step 102, and this processing is repeated. In a case where the power supply is turned off, the process progresses to Step 128.

In Step 128, the main control unit 26 stops the live view operation, and then, ends this processing. The main control unit 26 turns off the power supply of the distance measurement device 10.

Distance measurement processing which is executed by the distance measurement control unit 24 in a case where a release button is provided in the operating unit 44 is the same as the distance measurement processing which is executed by the distance measurement control unit 24 in a case where a distance measurement imaging start button is provided in the operating unit 44, and thus, description thereof will not be repeated.

In this way, the processing in a case where a release button is provided in the operating unit 44 is the same as in a case where a distance measurement imaging start button is provided in the operating unit 44. That is, in a case of performing the distance measurement to the subject, the live view image is displayed on the view finder 46, and transition is made to a state where the actual exposure is possible at the timing of the end of the distance measurement to perform still image capture. With this, it is possible to prevent the subject from becoming non-confirmable since the live view is not displayed during the distance measurement due to switching from live view imaging to still image capture at the start of the distance measurement.

Subsequently, a modification example of the respective processing which is executed by each of the main control unit 26 and the distance measurement control unit 24 of the distance measurement device 10 according to this embodiment will be described.

In the foregoing embodiment, an example where the main control unit 26 detects the timing of the end of the distance measurement using the distance measurement timer and transitions to a state where the actual exposure is possible has been described. In contrast, in a modification example, an example where the main control unit 26 receives a distance measurement end signal representing the timing of the end of the distance measurement from the distance measurement control unit 24 without using the distance measurement timer, and transitions to a state where the actual exposure is possible is provided.

Figure 8:
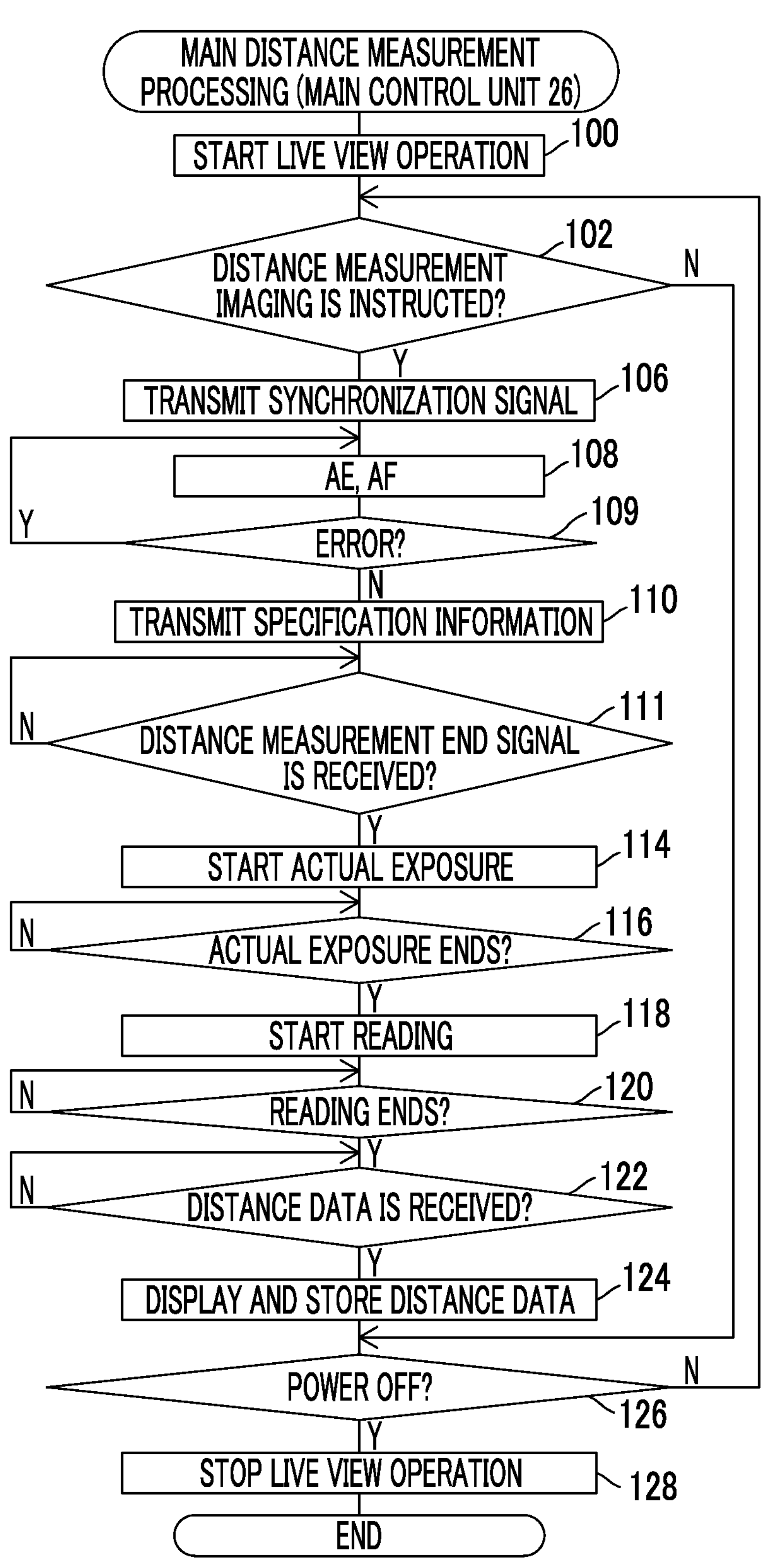
FIG. 8 is a flowchart showing a modification example of the flow of the control processing which is executed by the main control unit in a case where the distance measurement imaging start button is provided in the operating unit in the distance measurement device according to the embodiment.

First, a modification example of the control processing which is executed by the main control unit 26 in a case where the distance measurement imaging start button is provided in the operating unit 44 will be described. FIG. 8 is a flowchart showing a modification example of the flow of the control processing which is executed by the main control unit 26 in a case where the distance measurement imaging start button is provided in the operating unit 44 in the distance measurement device 10 of this embodiment. The flowchart shown in FIG. 8 is executed if power is supplied to the distance measurement device 10. The same processing as that in the flowchart of FIG. 5 is represented by the same reference numeral, and description thereof will not be repeated.

As shown in FIG. 8, the modification example is different from the foregoing embodiment only in that Step 104 of FIG. 5 is omitted and Step 111 is performed instead of Step 112.

That is, instead of measuring the timing of the end of the distance measurement using the timer, in Step 111, it is determined whether or not the distance measurement end signal is received from the distance measurement control unit 24, if the distance measurement end signal is received, the process progresses to Step 114, and the actual exposure is started. In the subsequent processing, the same processing as that in the foregoing embodiment may be performed.

Figure 9:
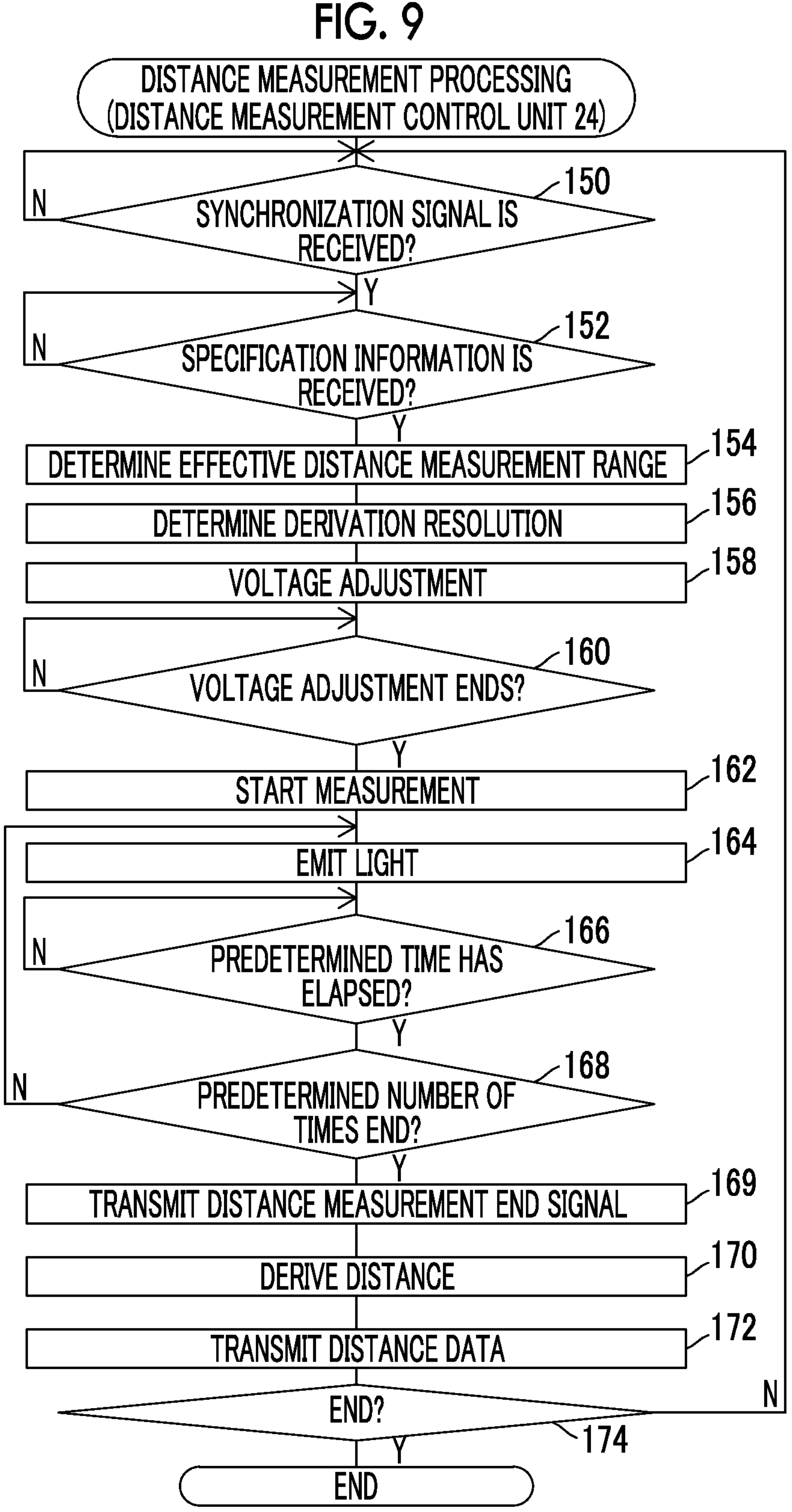
FIG. 9 is a flowchart showing a modification example of the flow of the distance measurement processing which is executed by the distance measurement control unit in a case where the distance measurement imaging start button is provided in the operating unit in the distance measurement device according to the embodiment.

Next, a modification example of the distance measurement processing which is executed by the distance measurement control unit 24 in a case where the distance measurement imaging start button is provided in the operating unit 44 will be described. FIG. 9 is a flowchart showing a modification example of the flow of the distance measurement processing which is executed by the distance measurement control unit 24 in a case where the distance measurement imaging start button is provided in the operating unit 44 in the distance measurement device 10 of this embodiment. The flowchart shown in FIG. 9 is executed if power is supplied to the distance measurement device 10. The same processing as that in the flowchart of FIG. 6 is represented by the same reference numeral, and description thereof will not be repeated.

As shown in FIG. 9, the modification example is different from the foregoing embodiment only in that Step 169 is further provided between Step 168 and Step 170 of FIG. 6.

That is, in Step 168, in a case where the predetermined number of measurements end, the process progresses to Step 169. In Step 169, the distance measurement control unit 24 transmits the distance measurement end signal to the main control unit 26 and progresses to Step 170. With this, the determination of Step 111 described above is affirmative. Here, the distance measurement control unit 24 determines the completion of a predetermined number of receptions of the emitted signals as the timing of the end of the distance measurement and transmits the distance measurement end signal representing that the distance measurement ends. With this, in a case where the distance measurement end signal is received, the determination of Step 111 is affirmative, and the main control unit 26 receives the emitted laser beam accurately, determines that the distance is derived, and starts the actual exposure. Step 169 may be performed after the distance derivation in next Step 170. In the processing after Step 170, the same processing as that in the foregoing embodiment may be performed.

Even if the processing is performed as described above, in a case of performing the distance measurement to the subject, the live view image can be displayed on the view finder 46, and transition can be made to a state where the actual exposure is possible at the timing of the end of the distance measurement to perform still image capture. With this, it is possible to prevent the subject from becoming non-confirmable since the live view is not displayed during the distance measurement due to switching from live view imaging to still image capture at the start of the distance measurement.

Figure 10:
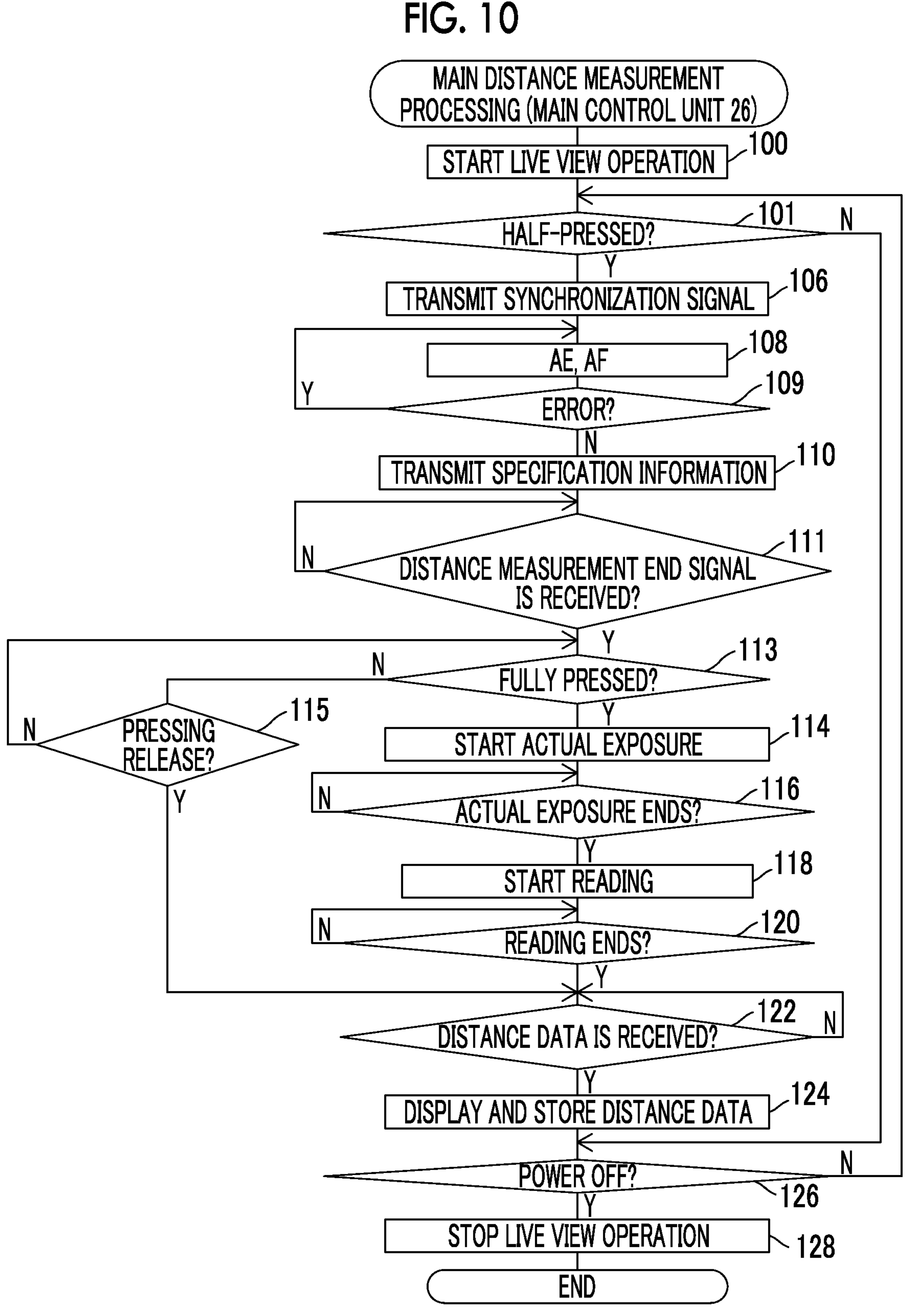
FIG. 10 is a flowchart showing a modification example of the flow of the control processing which is executed by the main control unit in a case where the release button is provided in the operating unit in the distance measurement device according to the embodiment.

Subsequently, a modification example of the control processing which is executed by the main control unit 26 in a case where the release button is provided in the operating unit 44 will be described. FIG. 10 is a flowchart showing a modification example of the flow of the control processing which is executed by the main control unit 26 in a case where the release button is provided in the operating unit 44 in the distance measurement device 10 of this embodiment. The flowchart shown in FIG. 10 is executed if power is supplied to the distance measurement device 10. The same processing as that in the flowchart of FIG. 7 is represented by the same reference numeral, and description thereof will not be repeated.

As shown in FIG. 10, the modification example is different from the foregoing embodiment only in that Step 104 of FIG. 7 is omitted and Step 111 is performed instead of Step 112.

That is, instead of measuring the timing of the end of the distance measurement using the timer, in Step 111, it is determined whether or not the distance measurement end signal is received from the distance measurement control unit 24. Then, if the distance measurement end signal is received, the process progresses to Step 113 and it is determined whether or not the release button of the operating unit 44 is fully pressed. In the subsequent processing, the same processing as that in the foregoing embodiment may be performed.

A modification example of the distance measurement processing which is executed by the distance measurement control unit 24 in a case where the release button is provided in the operating unit 44 is the same as the modification example of the distance measurement processing which is executed by the distance measurement control unit 24 in a case where the distance measurement imaging start button is provided in the operating unit 44, and thus, description thereof will not be repeated.

Even if the processing is performed as described above, in a case of performing the distance measurement to the subject, the live view image can be displayed on the view finder 46, and transition can be made to a state where the actual exposure is possible at the timing of the end of the distance measurement to perform still image capture. With this, it is possible to prevent the subject from becoming non-confirmable since the live view is not displayed during the distance measurement due to switching from live view imaging to still image capture at the start of the distance measurement.

Figure 11A:
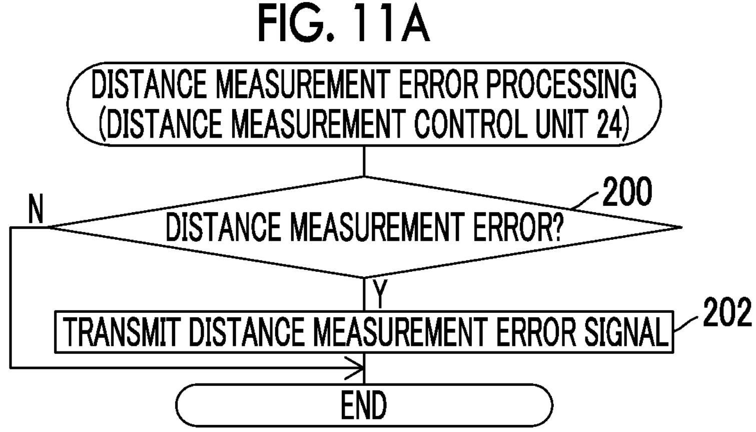
FIG. 11A is a flowchart showing an example of distance measurement error processing of the distance measurement control unit.
Figure 11B:
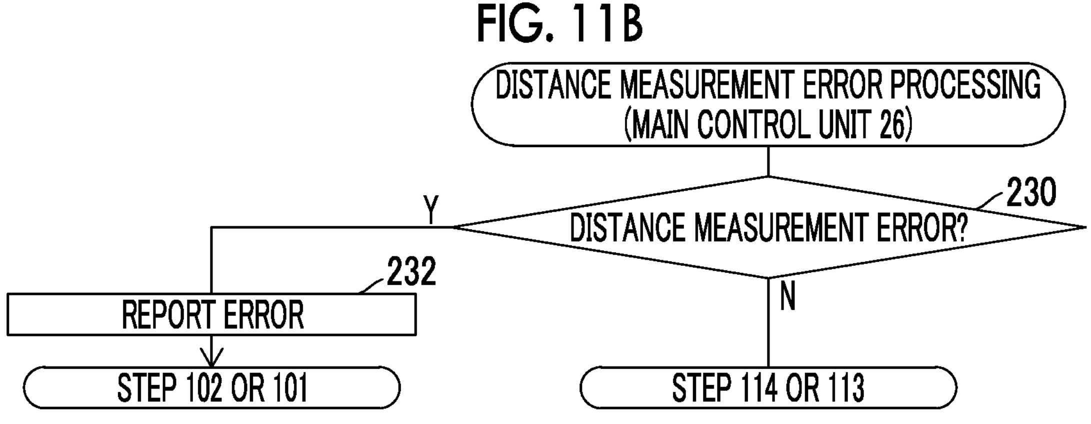
FIG. 11B is a flowchart showing an example of distance measurement error processing of the main control unit in a case where a distance measurement error occurs before transition to still image capture (actual exposure) (when a distance measurement end signal is received).
Figure 11C:
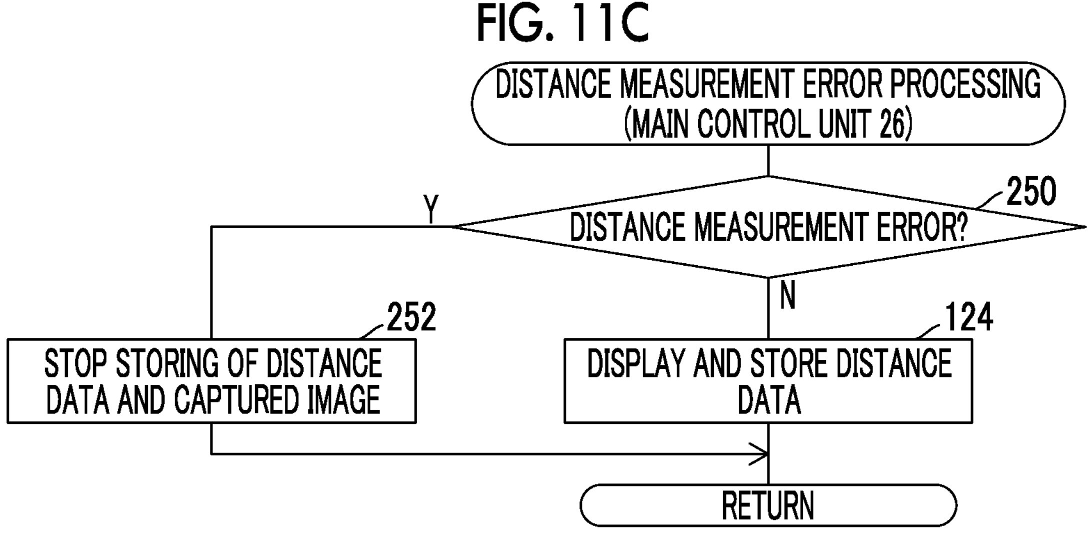
FIG. 11C is a flowchart showing an example of distance measurement error processing of the main control unit in a case where a distance measurement error occurs after still image capture (when distance data is received).

On the other hand, in the distance measurement control unit 24, there may occur a case where the distance to the subject cannot be measured (distance measurement error). In this case, in the modification examples, the main control unit 26 may end the processing without transitioning to the actual exposure of still image capture. Alternatively, the main control unit 26 may stop storage in the storage unit 48 to prevent storage of an incomplete captured image with no distance data. FIG. 11A is a flowchart showing an example of distance measurement error processing of the distance measurement control unit 24. FIG. 11B is a flowchart showing an example of distance measurement error processing of the main control unit 26 in a case where a distance measurement error occurs before transition to still image capture (actual exposure) (when the distance measurement end signal is received). FIG. 11C is a flowchart showing an example of distance measurement error processing of the main control unit 26 in a case where a distance measurement error occurs after still image capture (when distance data is received).

The distance measurement control unit 24 starts the distance measurement error processing, for example, as interrupt processing in a case where signal transmission or reception is impossible or in a case where the distance cannot be derived.

In the distance measurement error processing, in Step 200, the distance measurement control unit 24 determines whether or not it is a distance measurement error. In a case where no distance measurement error occurs, the determination is negative and the processing ends as it is. In a case where a distance measurement error occurs, the determination is affirmative and the process progresses to Step 202.

In Step 202, the distance measurement control unit 24 transmits a distance measurement error signal to the main control unit 26 to end the processing.

In a case where a distance measurement error occurs before transition to still image capture (for example, when the distance measurement end signal is received in Step 111 or when the distance measurement end time is reached in Step 112), in Step 230, the main control unit 26 determines whether or not it is a distance measurement error. That is, it is determined whether or not the distance measurement error signal is received from the distance measurement control unit 24. In a case where the distance measurement error signal is not received, the determination is negative, and the process progresses to the actual exposure of Step 114 described above. Or, the process progresses to the determination of full pressing of Step 113 described above.

In a case where the distance measurement error signal is received, the determination is affirmative, in Step 232, an error is reported, and the process returns to Step 102 or Step 101. As the error report, for example, a display representing that the distance measurement cannot be performed is performed. Alternatively, an error may be reported by sound or the like or may be reported by display and sound. In a case where a distance measurement error occurs, a need for the actual exposure as still image capture may be set in advance by the operating unit 44. With this, it is possible to arbitrarily set whether or not to perform still image capture in a case where the distance measurement is impossible.

In a case where a distance measurement error occurs after still image capture (when distance data is received in Step 122), in Step 250, the main control unit 26 determines whether or not it is a distance measurement error. That is, it is determined whether or not the distance measurement error signal is received from the distance measurement control unit 24. In a case where the distance measurement error signal is not received, the determination is negative, and the process progresses to the display and storage of distance data of Step 124 described above.

In a case where the distance measurement error signal is received, the determination is affirmative, the process progresses to Step 252, and storage of distance data and the captured image are stopped, and the process returns to the original processing (Step 126). In a case where a distance measurement error occurs, a need for storage of a still image obtained by the actual exposure may be set in advance by the operating unit 44. With this, it is possible to arbitrarily set whether or not to store still image in a case where the distance measurement is impossible.

In the foregoing embodiment and modification examples, when the main control unit 26 performs the actual exposure in Step 114, focus adjustment for the actual exposure may be performed again. In this case, for example, the processing of Step 122 may be performed instead of Steps 112 and 111, and before transition to the actual exposure in Step 114, the main control unit 26 may acquire distance measurement data and may perform focus adjustment using the acquired distance measurement data. With this, it is possible to reduce the time of focus adjustment for the actual exposure.

In the foregoing embodiment and modification examples, although a case where the light emission frequency of the laser beam is fixed to a predetermined number of times has been illustrated, the embodiment is not limited thereto. Since ambient light becomes noise for the laser beam, the light emission frequency of the laser beam may be a light emission frequency determined according to subject brightness.

Hereinafter, an example of a way of determining the light emission frequency of the laser beam will be described.

Figures 12, 13:
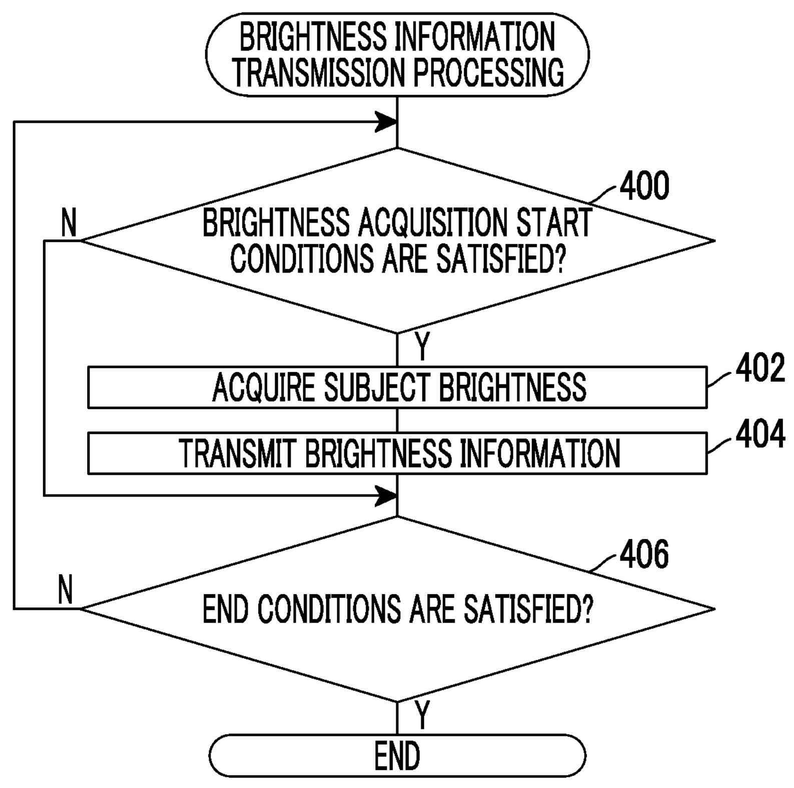
FIG. 12 is a conceptual diagram showing an example of the configuration of a light emission frequency determination table.
FIG. 13 is a flowchart showing an example of a flow of brightness information transmission processing.

The light emission frequency of the laser beam is derived from a light emission frequency determination table 300 shown in FIG. 12 as an example. In the light emission frequency determination table 300, the subject brightness and the light emission frequency of the laser beam are correlated with each other such that the higher the subject brightness, the larger the light emission frequency of the laser beam becomes. That is, in the light emission frequency determination table 300, the subject brightness has a magnitude relationship of $L_1<L_2< \ldots <L_n$, and the light emission frequency has a magnitude relationship of $N_1<N_2< \ldots <N_n$.

In the distance measurement device 10, in order to realize the derivation of the light emission frequency of the laser beam by the light emission frequency determination table 300, brightness information transmission processing (see FIG. 13) is executed by the main control unit 26, and light emission frequency determination processing (see FIG. 14) is executed by the distance measurement control unit 24.

First, the brightness information transmission processing which is executed by the main control unit 26 if the power switch of the distance measurement device 10 is turned on will be described referring to FIG. 13.

In the brightness information transmission processing shown in FIG. 13, first, in Step 400, the main control unit 26 determines whether or not brightness acquisition start conditions which are conditions for starting acquisition of subject brightness are satisfied. An example of the brightness acquisition start conditions is a condition that the release button is half-pressed. Another example of the brightness acquisition start conditions is a condition that the captured image is output from the imaging element 42.

In Step 400, in a case where the brightness acquisition start conditions are satisfied, the determination is affirmative, and the process progresses to Step 402. In Step 400, in a case where the brightness acquisition start conditions are not satisfied, the determination is negative, and the process progresses to Step 406.

In Step 402, the main control unit 26 acquires the subject brightness from the captured image, and then, the process progresses to Step 404. Here, although a case where the subject brightness is acquired from the captured image has been illustrated, the embodiment is not limited thereto. For example, if a brightness sensor which detects subject brightness is mounted in the distance measurement device 10, the main control unit 26 may acquire the subject brightness from the brightness sensor.

In Step 404, the main control unit 26 transmits brightness information indicating the subject brightness acquired in Step 402 to the distance measurement control unit 24, and then, the process progresses to Step 406.

In Step 406, the main control unit 26 determines whether or not end conditions which are conditions for ending this brightness information transmission processing are satisfied. An example of the end conditions is a condition that the power switch of the distance measurement device 10 is turned off. In Step 406, in a case where the end conditions are not satisfied, the determination is negative, and the process progresses to Step 400. In Step 406, in a case where the end conditions are satisfied, the determination is affirmative, and this brightness information transmission processing ends.

Next, the light emission frequency determination processing which is executed by the distance measurement control unit 24 if the power switch of the distance measurement device 10 is turned on will be described referring to FIG. 14.

Figures 14, 15:
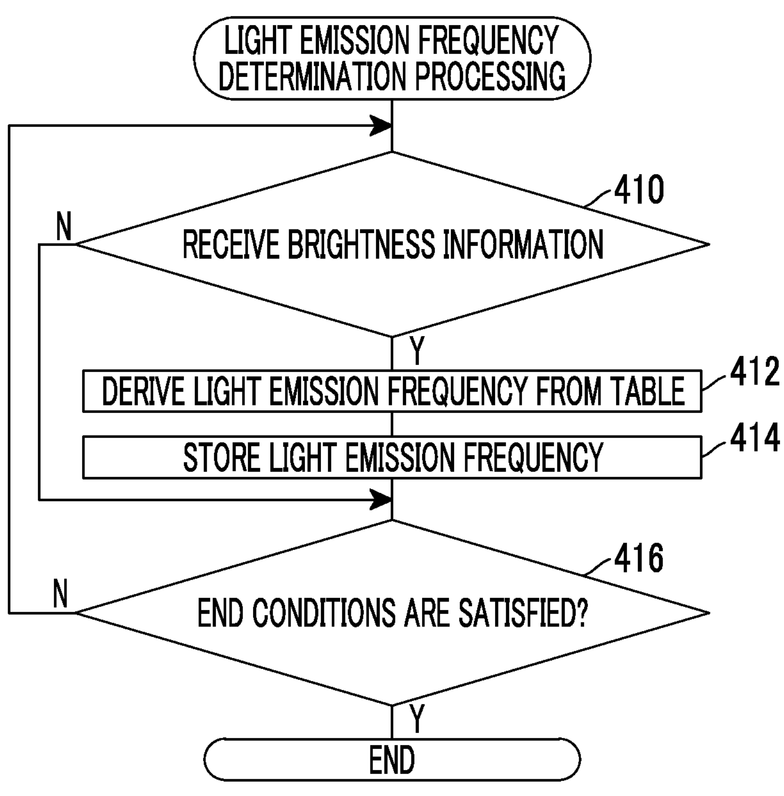
FIG. 14 is a flowchart showing an example of a flow of light emission frequency determination processing.
FIG. 15 is a conceptual diagram showing another example of the configuration of a light emission frequency determination table.

In the light emission frequency determination processing shown in FIG. 14, first, in Step 410, the distance measurement control unit 24 determines whether or not the brightness information transmitted by executing the processing of Step 404 is received. In Step 410, in a case where the brightness information transmitted by executing the processing of Step 404 is not received, the determination is negative, and the process progresses to Step 416. In Step 410, in a case where the brightness information transmitted by executing the processing of Step 404 is received, the determination is affirmative, and the process progresses to Step 412.

In Step 412, the distance measurement control unit 24 derives the light emission frequency corresponding to the subject brightness indicated by the brightness information received in Step 410 from the light emission frequency determination table 300, and then, the process progresses to Step 414.

In Step 414, the distance measurement control unit 24 stores the light emission frequency derived in the processing of Step 412 in the storage unit 48, and then, the process progresses to Step 416. The light emission frequency stored in the storage unit 48 by the processing of Step 416 means "a predetermined number of times" in Step 168 of the distance measurement processing shown in FIGS. 6 and 9.

In Step 416, the main control unit 26 determines whether or not end conditions which are conditions for ending this light emission frequency determination processing are satisfied. An example of the end conditions is a condition that the power switch of the distance measurement device 10 is turned off. In Step 416, in a case where the end conditions are not satisfied, the determination is negative, and the process progresses to Step 410. In Step 416, in a case where the end conditions are satisfied, the determination is affirmative, and this light emission frequency determination processing ends.

Next, another example of a way of determining the light emission frequency of the laser beam will be described.

As an example, the light emission frequency of the laser beam is derived according to a light emission frequency determination table 500 shown in FIG. 15. In the light emission frequency determination table 500, exposure state specification information ($E_1, E_2, \ldots, E_n$) uniquely determined according to the subject brightness and the light emission frequency ($N_1, N_2, \ldots, N_n$) of the laser beam are correlated with each other. Here, the exposure state specification information uniquely determined according to the subject brightness means, for example, exposure state specification information indicating that, the higher the subject brightness, the lower the exposure becomes.

In a case of deriving the light emission frequency of the laser beam using the light emission frequency determination table 500, exposure state specification information transmission processing (see FIG. 16) is executed by the main control unit 26, and light emission frequency determination processing (see FIG. 17) is executed by the distance measurement control unit 24.

First, the exposure state specification information transmission processing which is executed by the main control unit 26 if the power switch of the distance measurement device 10 is turned on will be described referring to FIG. 16.

Figure 16:
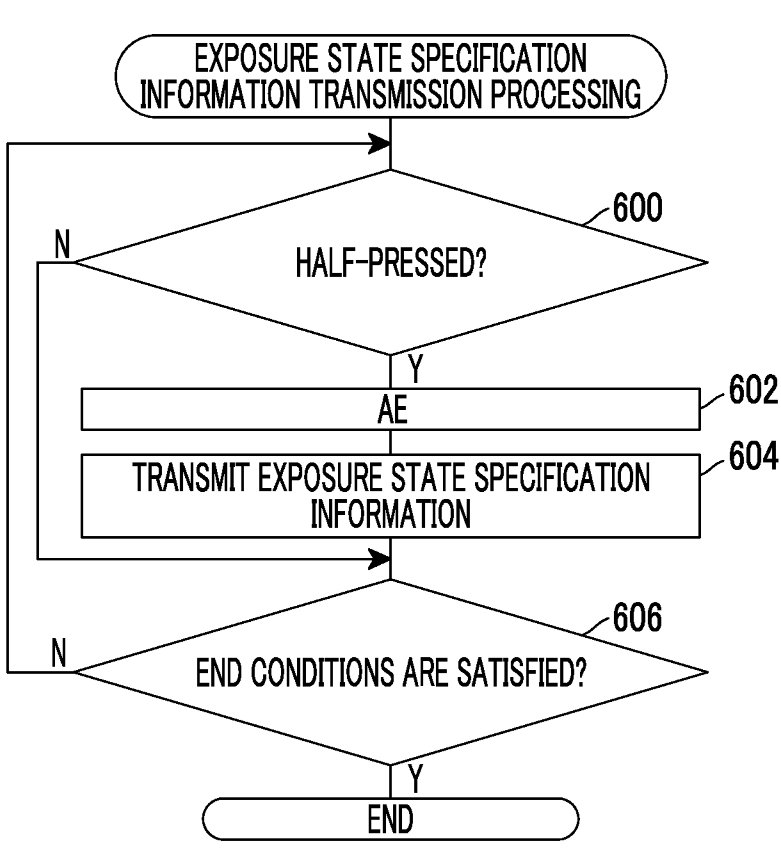
FIG. 16 is a flowchart showing another example of a flow of exposure state specification information transmission processing.

In the exposure state specification information transmission processing shown in FIG. 16, first, in Step 600, the main control unit 26 determines whether or not the release button is half-pressed. In Step 600, in a case where the release button is not half-pressed, the determination is negative, and the process progresses to Step 606. In Step 600, in a case where the release button is half-pressed, the determination is affirmative, and the process progresses to Step 602. In FIG. 16, although a case where the release button is provided in the operating unit 44 has been described as an example, in a case where a distance measurement imaging start button is provided in the operating unit 44, for example, Step 600 may be omitted, and in a case where power is supplied, the processing may be started.

In Step 602, the main control unit 26 performs AE based on the subject brightness acquired from the captured image, and then, the process progresses to Step 604.

In Step 604, the main control unit 26 transmits the exposure state specification information to the distance measurement control unit 24, and then, the process progresses to Step 606.

In Step 606, the main control unit 26 determines whether or not end conditions which are conditions for ending this exposure state specification information transmission processing are satisfied. An example of the end conditions is a condition that the power switch of the distance measurement device 10 is turned off. In Step 606, in a case where the end conditions are not satisfied, the determination is negative, and the process progresses to Step 600. In Step 606, in a case where the end conditions are satisfied, the determination is affirmative, and this exposure state specification information transmission processing ends.

Next, the light emission frequency determination processing which is executed by the distance measurement control unit 24 if the power switch of the distance measurement device 10 is turned on will be described referring to FIG. 17.

Figure 17:
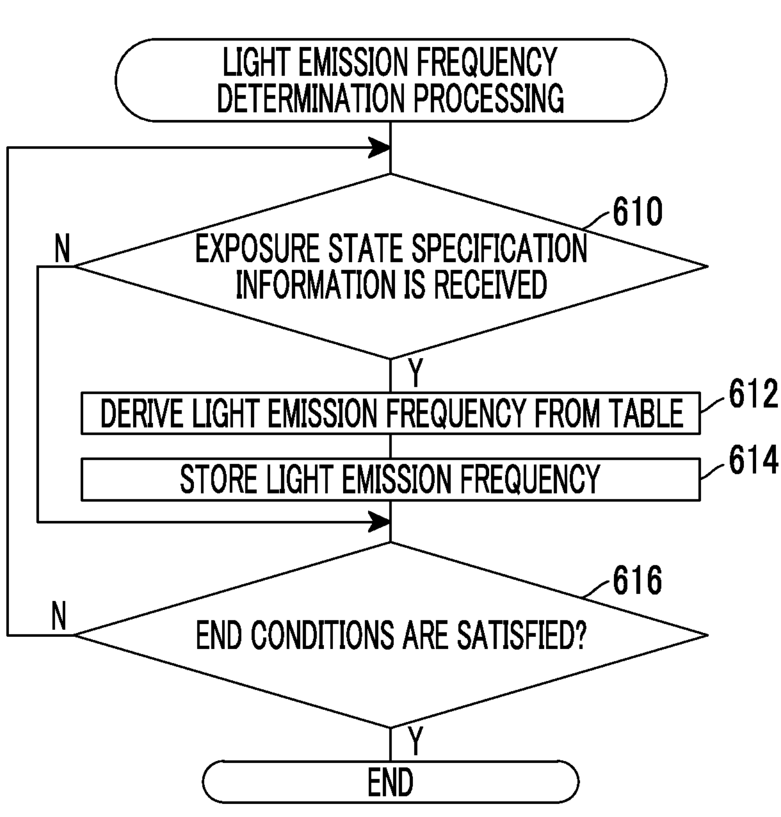
FIG. 17 is a flowchart showing another example of a flow of light emission frequency determination processing.

In the light emission frequency determination processing shown in FIG. 17, first, in Step 610, the distance measurement control unit 24 determines whether or not the exposure state specification information transmitted by executing the processing of Step 604 is received. In Step 610, in a case where the exposure state specification information transmitted by executing the processing of Step 604 is not received, the determination is negative, and the process progresses to Step 616. In Step 610, in a case where the exposure state specification information transmitted by the executing the processing of Step 604 is received, the determination is affirmative, and the process progresses to Step 612.

In Step 612, the distance measurement control unit 24 derives the light emission frequency corresponding to the exposure state specification information received in Step 610 from the light emission frequency determination table 500, and then, the process progresses to Step 614.

In Step 614, the distance measurement control unit 24 stores the light emission frequency derived in the processing of Step 612 in the storage unit 48, and then, the process progresses to Step 616. The light emission frequency stored in the storage unit 48 by the processing of Step 616 means "a predetermined number of times" in Step 168 of the distance measurement processing shown in FIGS. 6 and 9.

In Step 616, the main control unit 26 determines whether or not end conditions which are conditions for ending this exposure state specification information transmission processing are satisfied. An example of the end conditions is a condition that the power switch of the distance measurement device 10 is turned off. In Step 616, in a case where the end conditions are not satisfied, the determination is negative, and the process progresses to Step 610. In Step 616, in a case where the end conditions are satisfied, the determination is affirmative, and this exposure state specification information transmission processing ends.

In this way, since the distance measurement device 10 makes the light emission frequency of the laser beam larger when the subject brightness is higher, it is possible to obtain a distance measurement result, in which the influence of environmental noise is moderated, compared to a case where the light emission frequency of the laser beam is fixed regardless of the subject brightness.

In the foregoing embodiment and modification examples, although a case where the histogram relating to the measurement frequency of the distance to the subject is generated has been illustrated, the embodiment is not limited thereto. For example, a histogram relating to a measurement frequency of the time required for reciprocation from the emission and the reception of the laser beam may be generated. A time range corresponding to the effective distance measurement range may be set, and a histogram may be reconstructed with a resolution increased according to the time range. In this case, for example, a distance to the subject derived based on the time corresponding to the maximum value of the reconstructed histogram may be set to distance which is finally output (a distance which is provided to the user).

Figure 18A:
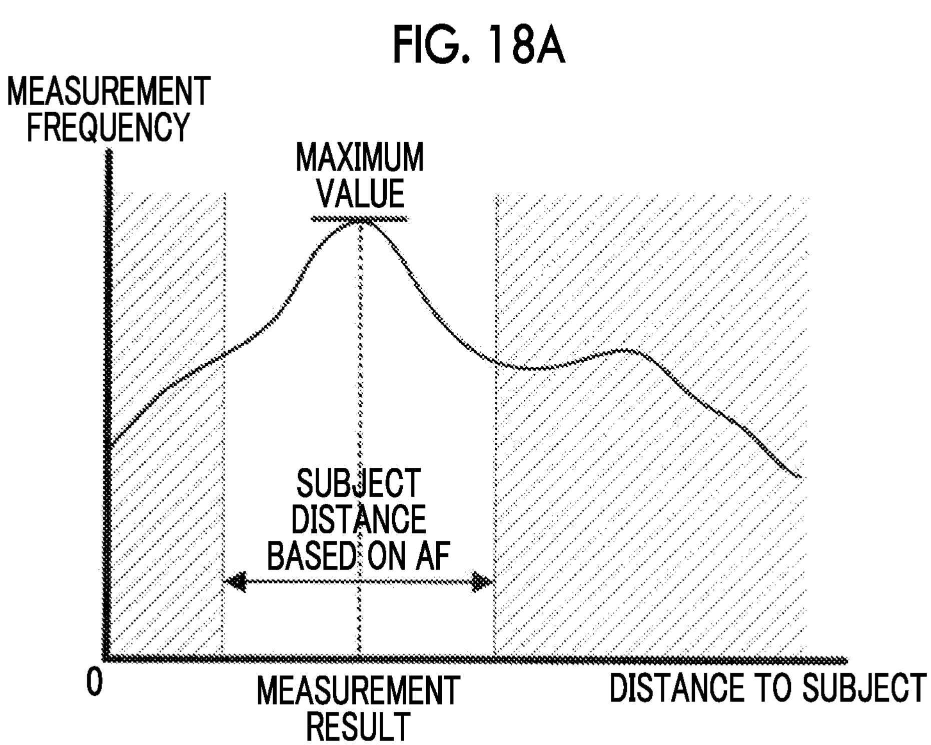
FIG. 18A is a graph showing a modification example of a histogram obtained in the distance measurement device according to the embodiment.
Figure 18B:
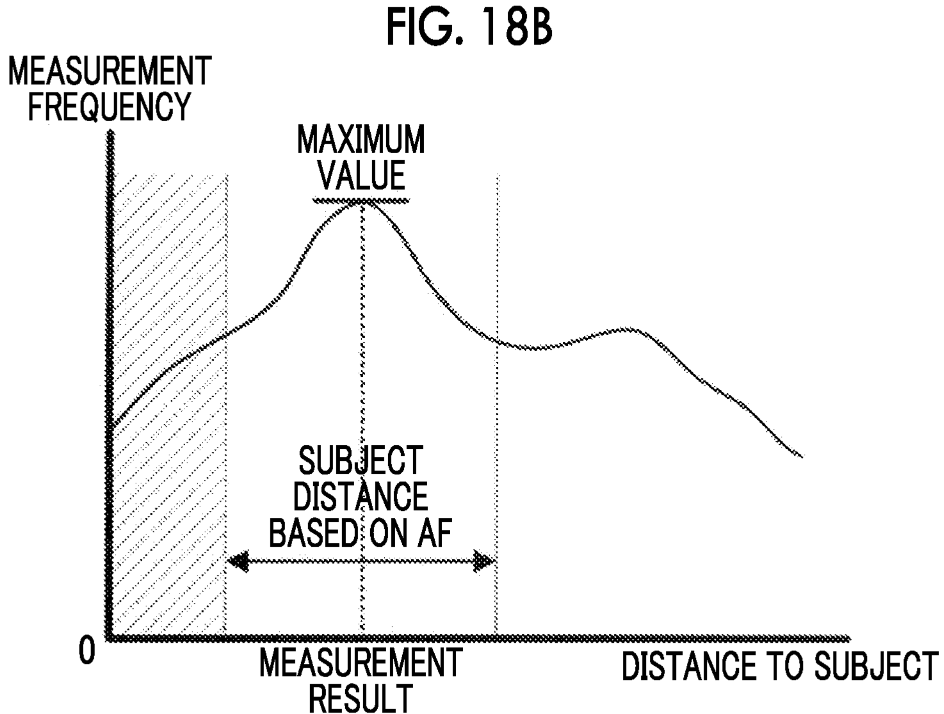
FIG. 18B is a graph showing a modification example of a histogram obtained in the distance measurement device according to the embodiment.
Figure 18C:
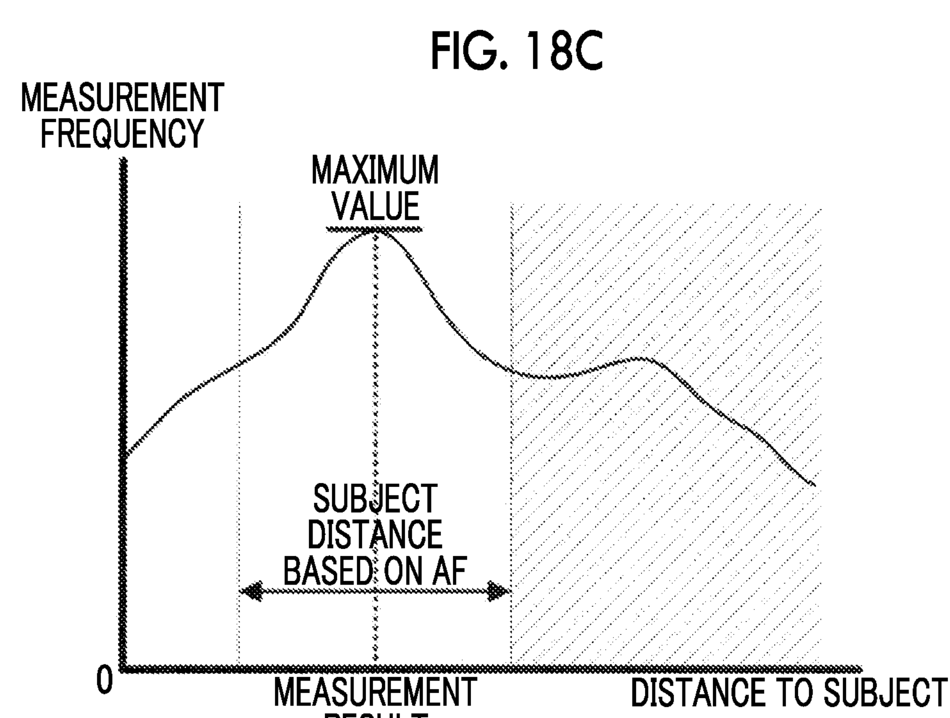
FIG. 18C is a graph showing a modification example of a histogram obtained in the distance measurement device according to the embodiment.

In the foregoing embodiment and modification examples, as shown in FIGS. 4 and 18A, although an example where both end portions of the histogram by all data are not included in the effective distance measurement range (in the example shown in FIG. 18A, a non-hatched range) has been described, the embodiment is not limited thereto. As an example, as shown in FIGS. 18B and 18C, one end portion (hatched portion) of the histogram may not be included in the effective distance measurement range (in the examples shown in FIGS. 18B and 18C, a non-hatched range).

In the foregoing embodiment and modification examples, for convenience of description, although a case where the histogram (the histogram by all data) generated once is reconstructed based on the effective distance measurement range has been illustrated, the embodiment is not limited thereto. For example, the distance measurement control unit 24 may generate a histogram for the remaining distances excluding the distances outside the effective distance measurement range among the distances (all data) to the subject obtained by multiple times of derivation. Even in this case, the distance measurement control unit 24 may generate a histogram with the above-described derivation resolution.

In the foregoing embodiment and modification examples, although a case where information relating to the distance to the subject is displayed on the view finder 46 so as to be superimposed on a live view image has been illustrated, the embodiment is not limited thereto. For example, information relating to the distance to the subject may be displayed in a display area different from the display area of the live view image. In this way, information relating to the distance to the subject may be displayed on the view finder 46 in parallel with the display of the live view image.

In the foregoing embodiment and modification examples, although a case where the distance measurement imaging start button or the release button provided in the distance measurement device 10 is operated has been illustrated, the embodiment is not limited thereto. For example, AE and AF may be started in response to an imaging preparation instruction received by a user interface (UI) unit of an external device used in the form of being connected to the distance measurement device 10, and actual exposure may be started in response to an imaging instructed received by the UI unit of the external device. Examples of the external device used in the form of being connected to the distance measurement device 10 include a smart device, a personal computer (PC), or a spectacles type or a wristwatch type wearable terminal device.

In the foregoing embodiment and modification examples, although a case where the live view image and the distance measurement result (information relating to the distance to the subject) are displayed on the view finder 46 has been illustrated, the embodiment is not limited thereto. For example, at least one of the live view image or the distance measurement result may be displayed on a display unit of the external device used in the form of being connected to the distance measurement device 10. Examples of the display unit of the external device used in the form of being connected to the distance measurement device 10 include a display of a smart device, a display of a PC, or a display of a wearable terminal device.

In the foregoing embodiment and modification examples, although the focus adjustment and the exposure adjustment by AF and AE have been illustrated, the embodiment is not limited thereto, and focus adjustment by manual focus and exposure adjustment by manual exposure may be applied.

In the foregoing embodiment and modification examples, although a case where the voltage adjustment is performed in Step 202 has been illustrated, the embodiment is not limited thereto, and the voltage adjustment may not necessarily be performed.

Figure 19:
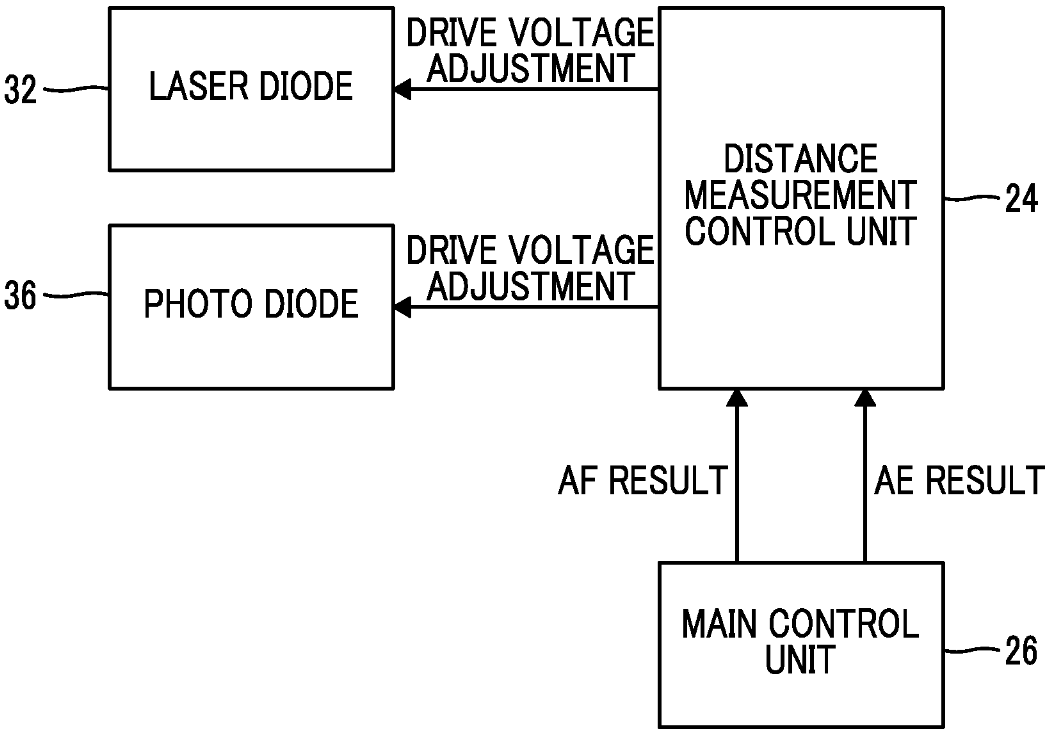
FIG. 19 is a block diagram showing an example of adjustment of a drive voltage based on AF and AE results.

In the foregoing embodiment and modification examples, in a case where the distance measurement control unit 24 performs the distance measurement, as shown in FIG. 19, the AF result (or the manual focus adjustment result) or the AE result is acquired from the main control unit 26. Then, at least one of the laser diode 32 or the photodiode 36 may be driven and adjusted based on the respective results.

The respective processing shown in the flowcharts described in the foregoing embodiment and modification examples are merely examples. Accordingly, it is needless to say that unnecessary steps may be deleted, new steps may be added, or the processing order may be rearranged without departing the gist of the invention. The respective processing included in the distance measurement processing or the distance measurement error processing described above may be realized by a software configuration using a computer by executing a program, or may be realized by other hardware configurations. Furthermore, the respective processing may be realized by a combination of a hardware configuration and a software configuration.

In the foregoing embodiment and modification examples, although the distance measurement device has been described as an example, the technique of the present disclosure may be applied to an imaging device, such as a digital camera.

In addition, the configurations, operations, and the like of the distance measurement device 10 and the like described in the foregoing embodiment and modification examples are examples, and obviously, may be modified depending on the situation without departing from the spirit of the present disclosure.

In the foregoing embodiment, although the laser beam has been illustrated as light for distance measurement, the embodiment is not limited thereto, and directional light which is light having directivity may be used. For example, directional light which is obtained by a light emitting diode (LED) or a super luminescent diode (SLD) may be used. The directivity of directional light is preferably the same directivity as the directivity of the laser beam, and is preferably, for example, the directivity usable in a distance measurement within a range of several meters to several kilometers.

All documents, patent applications, and technical specifications described in this specification are incorporated by reference in this specification as if each of the documents, the patent applications, and the technical specification is concretely and respectively specified as being incorporated by reference herein.

In regard to the above embodiment, the following appendixes are further disclosed.

(Appendix 1)

A distance measurement device comprising an imaging unit which captures a subject image formed by an imaging optical system forming the subject image indicating a subject, an emission unit which emits a laser beam along an optical axis direction of the imaging optical system, a light receiving unit which receives reflected light of the laser beam from the subject, a derivation unit which derives a distance to the subject based on the timing at which the laser beam is emitted by the emission unit and the timing at which the reflected light is received by the light receiving unit, a display unit which displays the subject image captured by the imaging unit, and a control unit which performs control such that, in a case of performing a distance measurement by the emission unit, the light receiving unit, and the derivation unit, the display unit displays the subject image captured by the imaging unit as a motion image and transition is made to a state where actual exposure by the imaging unit is possible at the timing of the end of the distance measurement.

(Appendix 2)

A distance measurement method comprising, in a case of performing a distance measurement to derive a distance to a subject based on the timing at which a laser beam is emitted by an emission unit emitting the laser beam along an optical axis direction of an imaging optical system forming a subject image indicating a subject and the timing at which reflected light is received by a light receiving unit receiving the reflected light of the laser beam from the subject, displaying the subject image captured by an imaging unit capturing the subject image on a display unit as a motion image and transitioning to a state where actual exposure by the imaging unit is possible at the timing of the end of the distance measurement.

(Appendix 3)

A distance measurement program which causes a computer to execute processing including, in a case of performing a distance measurement to derive a distance to a subject based on the timing at which a laser beam is emitted by an emission unit emitting the laser beam along an optical axis direction of an imaging optical system forming a subject image indicating a subject and the timing at which reflected light is received by a light receiving unit receiving the reflected light of the laser beam from the subject, displaying the subject image captured by an imaging unit capturing the subject image on a display unit as a motion image and transitioning to a state where actual exposure by the imaging unit is possible at the timing of the end of the distance measurement.

What is claimed is:

1. A distance measurement device comprising:

an image sensor that captures a subject image formed by an imaging optical system forming the subject image indicating a subject;

a display that displays the subject image captured by the image sensor; and a processor configured to perform a distance measurement that derives a distance to the subject, and to perform control such that, in a case of performing the distance measurement, the display displays the subject image captured by the image sensor, the distance measurement device transitions to a state in which an actual exposure is possible by the image sensor after the end of the distance measurement, and the display continues display of the subject image at least until the end of the distance measurement.

2. The distance measurement device according to claim 1, further comprising:

an emitter that emits directional light as light having directivity; and a light receiver that receives reflected light of the directional light from the subject, wherein, the processor is configured to perform the distance measurement based on a time at which the directional light is emitted by the emitter and a time at which the reflected light is received by the light receiver.

3. The distance measurement device according to claim 2, wherein the end of the distance measurement is the end of a period during which light emission and light reception are performed by the emitter and the light receiver.

4. The distance measurement device according to claim 1, wherein the end of the distance measurement is the end of a derivation period during which the distance is derived by the processor.

5. The distance measurement device according to claim 1, wherein the image sensor performs the actual exposure by the image sensor in a case where the distance is derived by the processor.

6. The distance measurement device according to claim 1, further comprising:

a setting unit that sets whether or not to perform the actual exposure by the image sensor in advance in a case where the distance measurement is impossible.

7. The distance measurement device according to claim 1, further comprising:

a memory that stores the distance derived by the processor, wherein, in a case where the distance measurement is impossible, storage by the memory is stopped.

8. The distance measurement device according to claim 6, further comprising:

a storage setting unit that sets whether or not to stop storage by the memory in a case where the derivation of the distance by the processor is impossible.

9. The distance measurement device according to claim 1, the processor further configured to perform focus adjustment of the imaging optical system to the subject based on the distance derived by the processor.

10. The distance measurement device according to claim 1, wherein the distance measurement is performed a number of times determined in advance according to subject brightness or exposure state specification information.

11. The distance measurement device according to claim 10, wherein the distance measurement is performed a larger number of times when the subject brightness is higher or when the exposure indicated by the exposure state specification information is lower.

12. A distance measurement method comprising:

causing an image sensor to capture a subject image formed by an imaging optical system forming the subject image indicating a subject;

displaying the captured subject image on a display;

performing a distance measurement to derive a distance to the subject; and transitioning a state of the image sensor to a state in which an actual exposure is possible by the image sensor after the end of the distance measurement; and the display continuing display of the subject image at least until the end of the distance measurement.

13. A non-transitory computer-readable storage medium storing a program that causes a computer to execute distance measurement processing, the distance measurement processing comprising:

causing an image sensor to capture a subject image formed by an imaging optical system forming the subject image indicating a subject;

displaying the captured subject image on a display;

performing a distance measurement to derive a distance to the subject; and transitioning a state of the image sensor to a state in which an actual exposure is possible by the image sensor after the end of the distance measurement; and the display continuing display of the subject image at least until the end of the distance measurement.

14. The distance measurement device according to claim 2, wherein driving of the light receiver is adjusted according to information of an exposure adjustment.

15. The distance measurement device according to claim 2, wherein, when a second focal distance is shorter than a first focal distance, an emission intensity of the emitter for the second focal distance is set lower than an emission intensity of the emitter for the first focal distance.

16. The distance measurement device according to claim 2, wherein, when a second focal distance is shorter than a first focal distance, a receiving sensitivity of the light receiver for the second focal distance is set lower than a receiving sensitivity of the light receiver for the first focal distance.

17. The distance measurement device according to claim 2, wherein, when a second exposure state is higher in exposure than a first exposure state, an emission intensity of the emitter for the second exposure state is set lower than an emission intensity of the emitter for the first exposure state.

18. The distance measurement device according to claim 1, wherein the display displays information relating to the distance to the subject.

19. The distance measurement device according to claim 1, wherein the processor is configured to, when power is supplied to the distance measurement device, control the display to start displaying the subject image captured by the image sensor, and control the display to continue displaying the subject image until power supply is turned off.

20. A digital camera comprising:

the distance measurement device according to claim 1.

21. The distance measurement device according to claim 1, wherein the processor is further configured to:

cause the display to initiate display of the subject image captured by the image sensor before receiving an instruction of distance measurement;

initiate the distance measurement in response to reception of the instruction of distance measurement; and cause the display to continue the display of the subject image until after the end of the distance measurement.

* * * * *